United States Patent
Hasman et al.

(10) Patent No.: US 6,972,906 B2
(45) Date of Patent: Dec. 6, 2005

(54) SPACE-VARIANT SUBWAVELENGTH POLARIZATION GRATING AND APPLICATIONS THEREOF

(75) Inventors: Erez Hasman, Hadera (IL); Zeev Bomzon, Kiryat Tivon (IL); Vladimir Kleiner, Nesher (IL)

(73) Assignee: Technion Research and Development Foundation Ltd., Haifa (IL)

( * ) Notice: Subject to any disclaimer, the term of this patent is extended or adjusted under 35 U.S.C. 154(b) by 80 days.

(21) Appl. No.: 10/017,932

(22) Filed: Dec. 18, 2001

(65) Prior Publication Data

US 2002/0118456 A1 Aug. 29, 2002

Related U.S. Application Data

(60) Provisional application No. 60/306,455, filed on Jul. 20, 2001, provisional application No. 60/304,096, filed on Jul. 11, 2001, and provisional application No. 60/258,040, filed on Dec. 27, 2000.

(51) Int. Cl.$^7$ .................................................. G02B 5/18
(52) U.S. Cl. .................... 359/569; 359/566; 359/573; 359/486; 430/321
(58) Field of Search .................................. 359/566, 569, 359/572, 573, 575, 486, 485; 430/321

(56) References Cited

U.S. PATENT DOCUMENTS

| | | | | |
|---|---|---|---|---|
| 5,343,292 A | * | 8/1994 | Brueck et al. | ............... 356/509 |
| 6,122,103 A | * | 9/2000 | Perkins et al. | ............... 359/486 |
| 6,391,528 B1 | * | 5/2002 | Moshrefzadeh et al. | .... 430/321 |
| 6,771,857 B1 | * | 8/2004 | Domash et al. | ............... 385/37 |

OTHER PUBLICATIONS

Bahram Javidi and Takanori Nomura, "Polarization encoding for optical security systems", *Optical Engineering* vol. 39 No. 9 pp. 2439–2443 (2000).

N. Davidson et al., "Realization of perfect shuffle and inverse perfect shuffle transforms with holographic elements", *Applied Optics* vol. 31 No. 11 pp. 1810–1812 (1992).

Uwe D. Zeitner et al., "Polarization multiplexing of diffractive elements with metal–stripe grating pixels", Applied Optics vol. 38 No. 11 pp. 2177–2181 (1999).

Gregory P. Nordin et al., "Micropolarizer array for infrared imaging polimetry", Journal of the Optical Society of America vol. 16 No. 5 pp. 1168–1174 (1999).

Franco Gori, "Measuring Stokes parameters by means of a polarization grating", Optics Letters vol. 24 No. 9 pp. 584–586 (1999).

Rigorous Coupled Wave Analysis (RCWA) (M. G. Moharam and T. K. Gaylord, "Rigorous coupled–wave analysis of metallic surface–relief gratings", Journal of the Optical Society of America, part A vol. 3 pp. 1780–1787 (1986).

(Continued)

*Primary Examiner*—Fayez G. Assaf
(74) *Attorney, Agent, or Firm*—Mark M. Friedman

(57) ABSTRACT

An optical device includes a plurality of metallic stripes, arranged in a substantially planar, subwavelength grating having a laterally varying, continuous grating vector, deposited on a substrate such as GaAs or ZnSe. When used as a polarizer, the device passes a laterally uniform polarized beam of electromagnetic radiation incident thereon with a predetermined, laterally varying transmissivity. When used to effect polarization state transformation, the device transforms a beam of electromagnetic radiation incident thereon into a transmitted beam having a predetermined, laterally varying polarization state. The device can be used to provide radially polarized electromagnetic radiation for accelerating subatomic particles or for cutting a workpiece. The device also can be used, in conjunction with a mechanism for measuring the lateral variation of the intensity of the transmitted beam, for measuring the polarization state of the incident beam.

55 Claims, 26 Drawing Sheets

OTHER PUBLICATIONS

Space–Variant polarization state manipulation with computer generated subwavelength metal stripe gratings Bomzon et al Optics Communications 192 (2001) 169–181.

Computer–generated space–variant polarization elements with subwavelength metal stripes, Bomzon et al Optics Letters Jan. 2001 vol. 26.

* cited by examiner

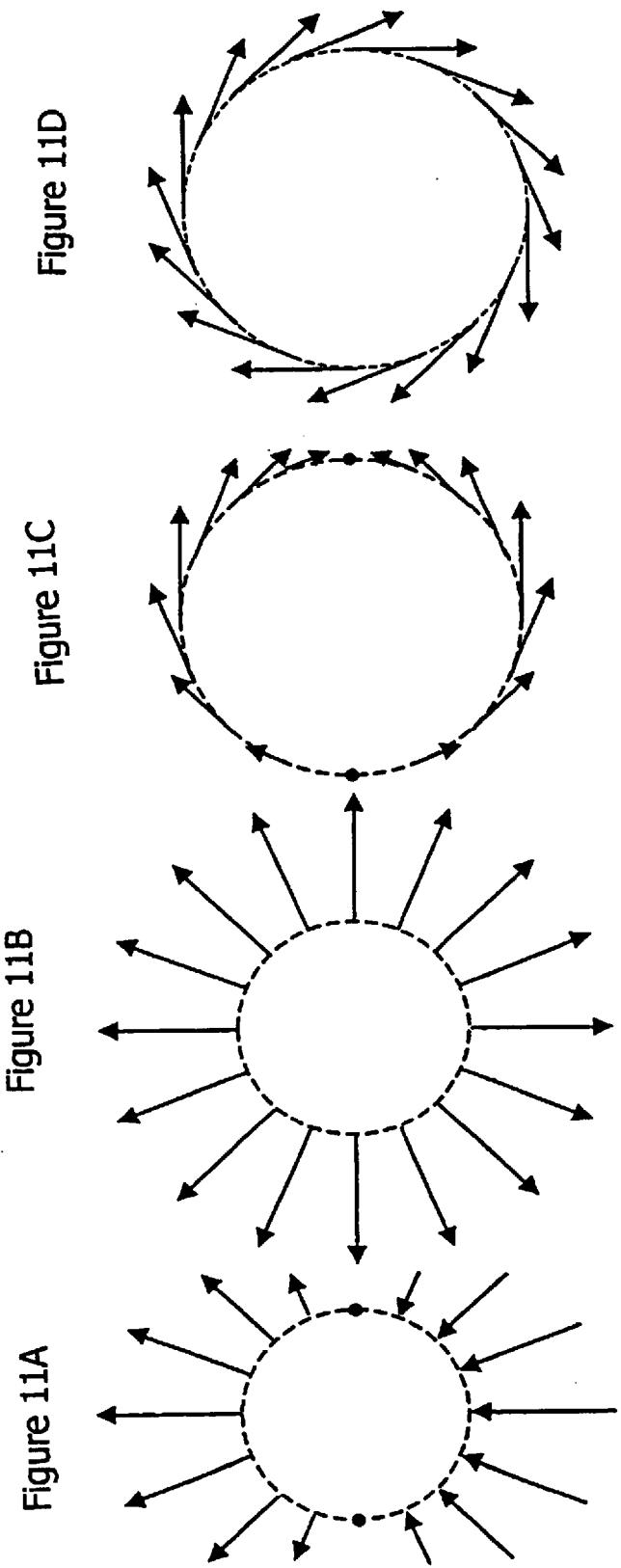

SPACE-VARIANT SUBWAVELENGTH POLARIZATION GRATING AND APPLICATIONS THEREOF

This application claims benefit of Ser. No. 60/258,040 filed Dec. 27, 2000, And claims benefit of Ser. No. 60/304,096 filed Jul. 11, 2001, And claims benefit of Ser. No. 60/306,455 filed Jul. 20, 2001.

FIELD AND BACKGROUND OF THE INVENTION

The present invention relates to the production and manipulation of optically polarized light and, more particularly, to a polarization grating whose grating vector varies continuously laterally and applications of this grating.

Laterally varying polarizers have found application in a variety of fields, including optical communication, optical computers, material processing, tight focusing, polarimetry, particle trapping and particle acceleration. For the most part, the transmission axes of these polarizers vary laterally in a discontinuous manner. For example, Bahram Javidi and Takanori Nomura, "Polarization encoding for optical security systems", *Optical Engineering* vol. 39 no. 9 pp. 2439–2443 (2000), perform polarization encoding using a polarization mask that consists of a rectangular array of small linear polarizers, oriented randomly at angles between 0° and 180°. N. Davidson et al., "Realization of perfect shuffle and inverse perfect shuffle transforms with holographic elements", *Applied Optics* vol. 31 no. 11 pp. 1810–1812 (1992), invert an optical perfect shuffle using an interlaced polarizing mask that is a one-dimensional array of linear polarizers oriented alternately at 0° and 90°. Uwe D. Zeitner et al., "Polarization multiplexing of diffractive elements with metal-stripe grating pixels", *Applied Optics* vol. 38 no. 11 pp. 2177–2181 (1999), do optical encryption by polarization multiplexing using an element array, some of whose elements are linear polarizers oriented at 0° and 90°. Gregory P. Nordin et al., "Micropolarizer array for infrared imaging polimetry", *Journal of the Optical Society of America* vol. 16 no. 5 pp. 1168–1174 (1999) do polimetry using an array of micropolarizers whose unit cell includes two 0° linear polarizers, one 90° linear polarizer and one 135° linear polarizer.

Franco Gori, "Measuring Stokes parameters by means of a polarization grating", *Optics Letters* vol. 24 no. 9 pp. 584–586 (1999) suggested using a polarizer whose transmission axis varies continuously laterally for the purpose of measuring the polarization state of a light beam. The embodiment of the polarizer actually suggested by Gori is only stepwise continuous: adjacent parallel strips of linearly polarizing film, with each strip's transmission axis tilted relative to its neighbors, so that the transmission axis of this polarizer is constant within each strip and discontinuous between strips.

Discontinuities in the lateral variation of the transmission axis of a polarizer can produce diffractions which degrade the optical efficiency of the polarizer. There is thus a widely recognized need for, and it would be highly advantageous to have, a polarizer whose transmission axis varies laterally in a truly continuous manner.

Metal wire gratings long have been used as polarizers. When the period of a metal wire grating is much smaller than the incident wavelength, the grating acts as a polarizer, reflecting all the light polarized parallel to the wires (TE mode) and transmitting only light polarized perpendicular to the wires (TM mode). For larger, but still subwavelength, periods, some TE mode light is transmitted, and it is necessary to use vectorial solutions of Maxwell's equations to predict the behavior of such gratings. This typically is done using Rigorous Coupled Wave Analysis (RCWA) (M. G. Moharam and T. K. Gaylord, "Rigorous coupled-wave analysis of metallic surface-relief gratings", *Journal of the Optical Society of America, part A* vol. 3 pp. 1780–1787 (1986).

SUMMARY OF THE INVENTION

According to the present invention there is provided an optical device, for manipulating incident light of at most a certain maximum wavelength, including: (a) a substantially planar grating including a plurality of electrically conducting stripes and having a space-variant, continuous grating vector, at least a portion of the grating having a local period less than the maximum wavelength of the incident light.

According to the present invention there is provided a method of modulating an intensity of laterally uniform, polarized light of at most a certain maximum wavelength, including the steps of: (a) solving an equation $\nabla \times \vec{K}(K_0, \beta) = 0$ for a grating vector $\vec{K}$ that is defined by a wavenumber $K_0$ and by a direction $\beta$ relative to a reference direction, the modulation depending on $\beta$, $\vec{K}$ being such that at least a portion of a grating fabricated in accordance with $\vec{K}$ has a local period less than the maximum wavelength of the light; (b) fabricating the grating in accordance with the grating vector $\vec{K}$; and (c) directing the light at the grating.

According to the present invention there is provided a method of imposing a polarization state having a predetermined, laterally varying azimuthal angle $\psi$ on light of at most a certain maximum wavelength, including the steps of: (a) solving an equation $\nabla \times \vec{K}(K_0, \beta) = 0$ for a grating vector $\vec{K}$ that is defined by a wavenumber $K_0$ and by a direction $\beta$ relative to a reference direction, $\beta$ being related to $\psi$ by $\beta = \psi - \Delta\psi(K_0)$, $\vec{K}$ being such that at least a portion of a grating fabricated in accordance with $\vec{K}$ has a local period less than the maximum wavelength of the light; (b) fabricating the grating in accordance with $\vec{K}$; and (c) directing the light at the grating.

According to the present invention there is provided a method of measuring a polarization state of light of at most a certain maximum wavelength, including the steps of: (a) providing a grating having a transmission axis that varies in one lateral dimension, at least a portion of the grating having a local period less than the maximum wavelength of the light; (b) directing the light at the grating; (c) measuring an intensity of the light that has traversed the grating; and (d) determining three Stokes parameters of the light from the intensity.

According to the present invention there is provided a method of measuring a polarization state of light of at most a certain maximum wavelength, including the steps of: (a) providing a grating having a reflection axis that varies in one lateral dimension, at least a portion of the grating having a local period less than the maximum wavelength of the light; (b) directing the light at the grating; (c) measuring an intensity of the light that is reflected from the grating; and (d) determining three Stokes parameters of the light from the intensity.

According to the present invention there is provided an optical device, for transforming an incident beam of light into a transformed beam of light, including: (a) a substantially planar grating including a plurality of metal stripes and having a space-variant continuous grating vector, such that the transformed beam is substantially free of propagating orders higher than zero order.

According to the present invention there is provided a method of transforming an incident beam of laterally uniform, polarized light into a transformed beam having a modulated intensity, including the steps of: (a) solving an equation $\nabla \times \vec{K}(K_0,\beta)=0$ for a grating vector $\vec{K}$ that is defined by a wavenumber $K_0$ and by a direction $\beta$ relative to a reference direction, the modulation depending on $\beta$, $\vec{K}$ being such that the transformed beam is substantially free of propagating orders higher than zero order; (b) fabricating the grating in accordance with the grating vector $\vec{K}$; and (c) directing the incident beam at the grating.

According to the present invention there is provided a method of transforming an incident light beam into a transformed beam upon which is imposed a polarization state having a predetermined, laterally varying azimuthal angle $\psi$, including the steps of: (a) solving an equation $\nabla \times \vec{K}(K_0,\beta)=0$ for a grating vector $\vec{K}$ that is defined by a wavenumber $K_0$ and by a direction $\beta$ relative to a reference direction, $\beta$ being related to $\psi$ by $\beta=\psi-\Delta\psi(K_0)$, $\vec{K}$ being such that the transformed beam is substantially free of propagating orders higher than zero order; (b) fabricating the grating in accordance with $\vec{K}$; and (c) directing the incident beam at the grating.

According to the present invention there is provided a method of measuring a polarization state of an incident light beam, including the steps of: (a) providing a grating having a transmission axis that varies in one lateral dimension, the grating being operative to transform the incident beam into a transformed beam that is substantially free of propagating orders higher than zero order; (b) directing the incident beam at the grating; (c) measuring an intensity of the transformed beam; and (d) determining three Stokes parameters of the light from the intensity.

All references to "light" herein are to be understood as referring to electromagnetic radiation generally, even though the primary application of the present invention is to infrared light.

The optical device of the present invention is a planar grating of electrically conducting (preferably metallic) stripes, supported on a transparent substrate and arranged so that the grating vector $\vec{K}$ has a vanishing curl. The vector $\vec{K}$ is defined by its magnitude: a wavenumber, or spatial frequency, $K_0$; and by its direction $\beta$ relative to a reference direction. In fact, $\beta$ is the local transmission axis of the grating. Either $K_0$ or $\beta$ or both may vary laterally and continuously. A grating vector with the property that either $K_0$ or $\beta$ or both may vary laterally is denoted herein as a "space-variant" grating vector. The lateral variation may be periodic, for example, translation ally periodic or rotationally periodic.

According to the present invention, the grating is a subwavelength grating, meaning that the local period of at least a portion of the grating is less than the maximum wavelength of the light that is manipulated by the grating. It is to be understood that the present invention may be used to manipulate either monochromatic light or polychromatic light. All references herein to a "maximum" wavelength are to the wavelength that is used to define the "subwavelength" nature of the grating. One consequence of the subwavelength nature of the grating is that the transmitted beam is substantially free of propagating orders higher than zero order.

The stripes are supported on a substrate. Preferable materials for the substrate include gallium arsenide and zinc selenide for infrared applications, and quartz and silica glass for visible light applications.

Although the description herein is directed at transmission gratings, it is to be understood that the scope of the present invention includes both transmission gratings and reflection gratings. In particular, the subwavelength nature of a reflection grating of the present invention leads to the reflected beam being substantially free of propagating orders higher than zero order. It will be obvious to one skilled in the art how to modify the teachings herein for the case of reflection gratings.

When used as a polarizer, the optical device of the present invention is operative to pass or reflect laterally uniform polarized incident light with a predetermined, laterally varying transmissivity or reflectivity, so that the polarization of the transmitted or reflected light varies laterally, i.e., is space-variant in a manner that corresponds to the space-variant nature of the grating vector. Preferably, this transmissivity or reflectivity varies periodically in one lateral direction.

When used to effect polarization state transformations, the optical device of the present invention is operative to transform light incident thereon into a transmitted or reflected beam having a predetermined, laterally varying polarization state. Preferably, the transmitted or reflected beam has an azimuthal angle that varies linearly in one lateral dimension. Alternatively, the transmitted or reflected beam is either radially polarized or azimuthally polarized, with the radial or azimuthal polarization being either in-phase or anti-phase.

The scope of the present invention also includes a particle accelerator that is based on the optical device of the present invention. Specifically, this particle accelerator includes: (a) a source of light; (b) a first optical mechanism for forming the light into an annular beam; (c) the optical device of the present invention, for imposing radial polarization on the annular beam; (d) a second optical mechanism for focusing the radially polarized annular beam onto a focal region; and (e) a particle source for directing a beam of the particles longitudinally through the focal region.

The scope of the present invention also includes a method of cutting a workpiece. The optical device of the present invention is used to impose radial polarization on a beam of light. The radially polarized beam is directed at the workpiece to cut the workpiece.

The scope of the present invention also includes an apparatus, for measuring the polarization state of light, that is based on the optical device of the present invention. Specifically, this apparatus includes, in addition to the optical device of the present invention, a mechanism for measuring the lateral variation of the intensity of the light after the light has been manipulated by the device of the present invention.

The scope of the present invention also includes a method of modulating the intensity of laterally uniform, polarized light. The equation $\nabla \times \vec{K}=0$ is solved for the grating vector $\vec{K}$ whose direction $\beta$ gives the desired modulation. A grating is fabricated in accordance with this grating vector, and the electromagnetic radiation is directed at the grating. Note that the grating need not be an optical device of the present invention, although preferably the grating is formed as electrically conducting stripes on a substrate, as in the optical device of the present invention. Preferable materials for the substrate include gallium arsenide and zinc selenide for infrared applications, and quartz and silica glass for visible light applications.

The scope of the present invention also includes a method of imposing a polarization state having a predetermined, laterally varying azimuthal angle $\psi$ on light. The equation $\nabla \times \vec{K} = 0$ is solved for the grating vector $\vec{K}$ whose direction $\beta$ is related to $\psi$ by $\beta = \psi - \Delta\psi(K_0)$. A grating is fabricated in accordance with this grating vector, and the electromagnetic radiation is directed at the grating. Note that the grating need not be an optical device of the present invention, although preferably the grating is formed as electrically conducting stripes on a substrate, as in the optical device of the present invention. Preferable materials for the substrate include gallium arsenide and zinc selenide for infrared applications and quartz and silica glass for visible light applications. The reference direction for $\beta$ may be the x-direction of a Cartesian (x,y) coordinate system, so that $K_0$ and $\beta$ satisfy:

$$\frac{\partial K_0}{\partial y}\cos(\beta) - K_0\sin(\beta)\left[\frac{\partial \psi}{\partial y} - \frac{\partial \Delta\psi}{\partial K_0}\frac{\partial K_0}{\partial y}\right] = \frac{\partial K_0}{\partial x}\sin(\beta) - K_0\cos(\beta)\left[\frac{\partial \psi}{\partial x} - \frac{\partial \Delta\psi}{\partial K_0}\frac{\partial K_0}{\partial x}\right]$$

Alternatively, the reference direction for $\beta$ may be the radial direction of a polar (r,θ) coordinate system.

The scope of the present invention also includes a method of measuring the polarization state of light. The light is directed at a grating that has a transmission axis that varies in one lateral direction. Although a piecewise continuous, laterally varying grating, such as Gori's grating, may be used, it is preferable to use a grating whose the transmission axis varies continuously in the one lateral direction. Most preferably, the transmission axis of the grating varies linearly in the one lateral direction. The intensity of the light that has traversed the grating is measured, preferably in the near field, and at least three Stokes parameters of the light are determined from the measured intensity, preferably by performing respective integral transforms of the measured intensity.

Preferably, the Stokes parameters are $S_0$, $S_1$ and $S_2$. Alternatively, at least a portion of the light is caused to traverse a quarter wave plate before traversing the grating, and the Stokes parameters are $S_0$, $S_1$ and $S_3$.

As noted above, the grating need not be an optical device of the present invention, although it is preferable that the grating be substantially planar and include a plurality of electrically conducting stripes arranged so that the grating has a space-variant, continuous grating vector $\vec{K}$, such that the transmission axis is the direction $\beta$ of $\vec{K}$.

BRIEF DESCRIPTION OF THE DRAWINGS

The invention is herein described, by way of example only, with reference to the accompanying drawings, wherein:

FIG. 11A illustrates in-phase radial polarization;

FIG. 11B illustrates anti-phase radial polarization;

FIG. 11C illustrates in-phase azimuthal polarization;

FIG. 11D illustrates anti-phase azimuthal polarization;

DESCRIPTION OF THE PREFERRED EMBODIMENTS

The present invention is of a polarization grating which can be used to impose, on incident electromagnetic radiation, a laterally varying intensity modulation or a laterally varying polarization state.

The principles and operation of a polarization grating according to the present invention may be better understood with reference to the drawings and the accompanying description.

Gori defined a "polarization grating" as "a transparency in which the polarization of the incident wave is changed periodically along a line". The present invention defines a "polarization grating" somewhat more generally, as an optical device that imposes a (not necessarily periodic) laterally varying intensity modulation, or alternatively a (not necessarily periodic) laterally varying polarization state, on an incident beam of electromagnetic radiation that is laterally uniform in intensity and polarization state. The lateral variation may be in one or both orthogonal directions transverse to the direction of propagation. As will be seen, lateral variation in only one transverse direction is an important special case. Alternatively, the lateral variation may be along the radial and/or azimuthal directions of a circular coordinate system.

Figure 1:
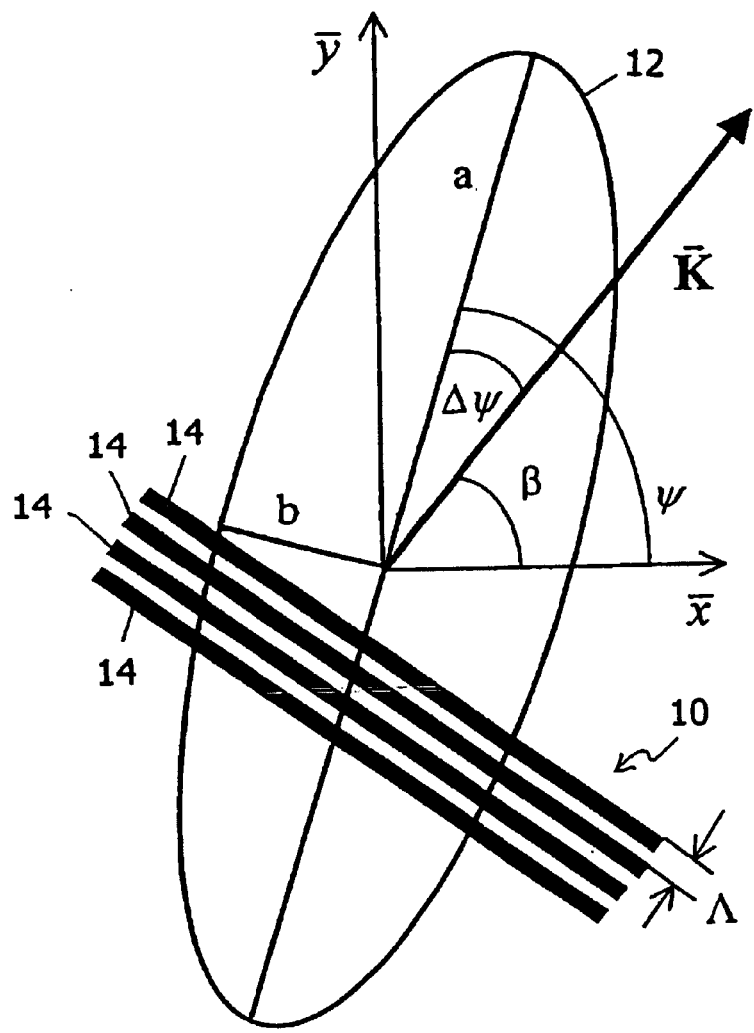
FIG. 1 illustrates the definition of the grating vector of a subwavelength grating.

Referring now to the drawings, FIG. 1 illustrates the definition of the grating vector $\vec{K}$ of a subwavelength grating 10 on which is incident a beam of electromagnetic radiation, and the geometry of the polarization ellipse 12 of the electromagnetic radiation that is transmitted by grating 10. Grating 10 consists of (locally) parallel, electrically conducting stripes 14, only four of which are shown, in the x,y plane of a Cartesian (x,y,z) coordinate system. Stripes 14 are deposited on a planar substrate (not shown) that is transparent to the incident beam. The period of grating 10 is $\Lambda$. The direction of propagation of the electromagnetic radiation is perpendicular to grating 10, i.e., in the z-direction. The grating vector $\vec{K}$ is defined by its magnitude $K_0=2\pi/\Lambda$ and by its direction $\beta$ relative to the +x-axis as a reference direction. Polarization ellipse 12 is defined by its azimuthal angle $\psi$, which is the angle between the x-axis and the major axis of polarization ellipse 12, and by its ellipticity $\chi$, which is the arctangent of the ratio b/a of the length b of the minor axis of polarization ellipse 12 to the length a of the major axis of polarization ellipse 12. The angle $\Delta\psi$ is the angle between the major axis of polarization ellipse 12 and the grating vector $\vec{K}$.

Figure 19A:
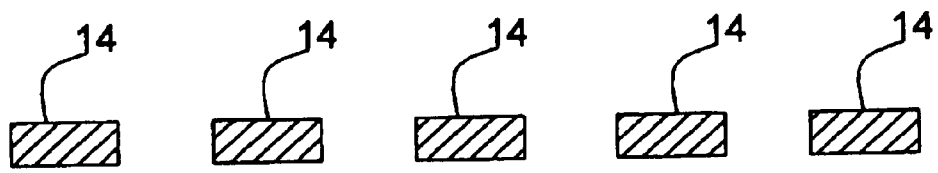
FIGS. 19A and 19B are cross sections, in a plane perpendicular to the plane of FIG. 1, of rectangular and triangular stripe structures.
Figure 19B:
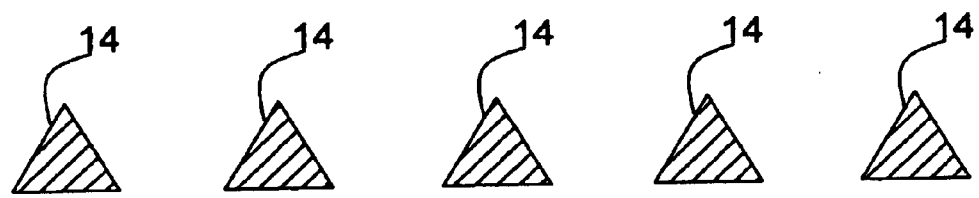

The characterization of stripes 14 as "stripes" refers to the geometry of stripes 14 in the xy plane. The three-dimensional structure of stripes 14 may be any structure that is convenient to fabricate. FIGS. 19A and 19B show two such structures, in cross-section in a plane perpendicular to the xy plane. FIG. 19A shows stripes 14 with a rectangular cross section. FIG. 19B shows stripes 14 with a triangular cross section.

As noted above, the gratings of the present invention are subwavelength gratings, i.e., gratings 10 whose local period $\Lambda$ is less than the wavelength of the incident beam.

Understanding of the present invention is facilitated by considering one of the simplest embodiments thereof: a chirp grating, i.e., a grating in which $\beta$ is constant and $\Lambda$ varies linearly in the x-direction: $\Lambda=\Lambda_0+bx$. The grating vector $\vec{K}$ then is:

$$\vec{K} = \frac{2\pi}{\Lambda_0 + bx}\hat{x} \quad (1)$$

where $\hat{x}$ is a unit vector in the +x-direction. Such a grating, or indeed any grating of the present invention, can be characterized by its Polarization Contrast Ratio (PCR), which is defined as $$P(\Lambda) = \frac{T_{TM}(\Lambda)}{T_{TE}(\Lambda) + T_{TM}(\Lambda)} \quad (2)$$

where $T_{TE}$ is the zero order transmission when the incident beam is TE polarized and $T_{TM}$ is the zero order transmission when the incident beam is TM polarized. If only TM polarized radiation is transmitted then P=1. If only TE polarized radiation is transmitted then P=0. Thus, the PCR of a grating provides a measure of the grating's efficiency as a polarizer. Because the polarization of TE and TM beams remains unchanged when transmitted through the grating, and because any polarization state is a superposition of TE and TM beams, the transmission coefficient for an arbitrarily polarized beam must lie between $T_{TE}$ and $T_{TM}$. This means that if the PCR is greater than 0.5, then maximum transmission is achieved for TM polarized radiation, and that if the PCR is smaller than 0.5, then maximum transmission is achieved for TE polarized radiation.

In order to investigate the dependence of PCR on $\Lambda$ and on the substrate, chirped gratings of dimension 5 millimeters×7.5 millimeters were fabricated on GaAs and ZnSe substrates. The local period varied linearly at a rate b=0.4 micron/millimeter, from $\Lambda(x=0)=\Lambda_0=2$ microns to $\Lambda(x=7.5)=5$ microns. The gratings were fabricated with a duty cycle of 0.55. To realize the gratings, a chrome mask was fabricated using high-resolution laser lithography. The gratings then were transferred onto their respective substrates by use of an AZ 5214 photoresist. The metal stripes then were realized using a lift-off technique. The GaAs substrate consisted of a semi-insulating wafer 500 microns thick. The ZnSe substrate was a 2 millimeter thick window. The metal stripes consisted of a 10 nanometer layer of titanium coated by 60 nanometers of gold. An anti-reflection coating was applied to the backsides of the substrates.

The experimental setup for measuring the intensity transmitted through the chirped gratings was as follows. Linearly polarized light at a wavelength of 10.6 microns was emitted from a carbon dioxide laser and then passed through an additional polarizer to ensure the purity of the polarization. This was followed by a half wave plate, which enabled rotation of the incident polarization without energy loss. The beam then was expanded and projected onto the chirped grating of interest. The transmitted beam was magnified through a lens, and the grating was imaged onto a Spiricon Pyrocam I camera. The average intensity was calculated for each row of pixels in the y direction, yielding an average of the transmitted intensity as a function of $\Lambda$. The measurement was repeated for TE and TM polarized beams and the PCR was calculated.

Figure 2:
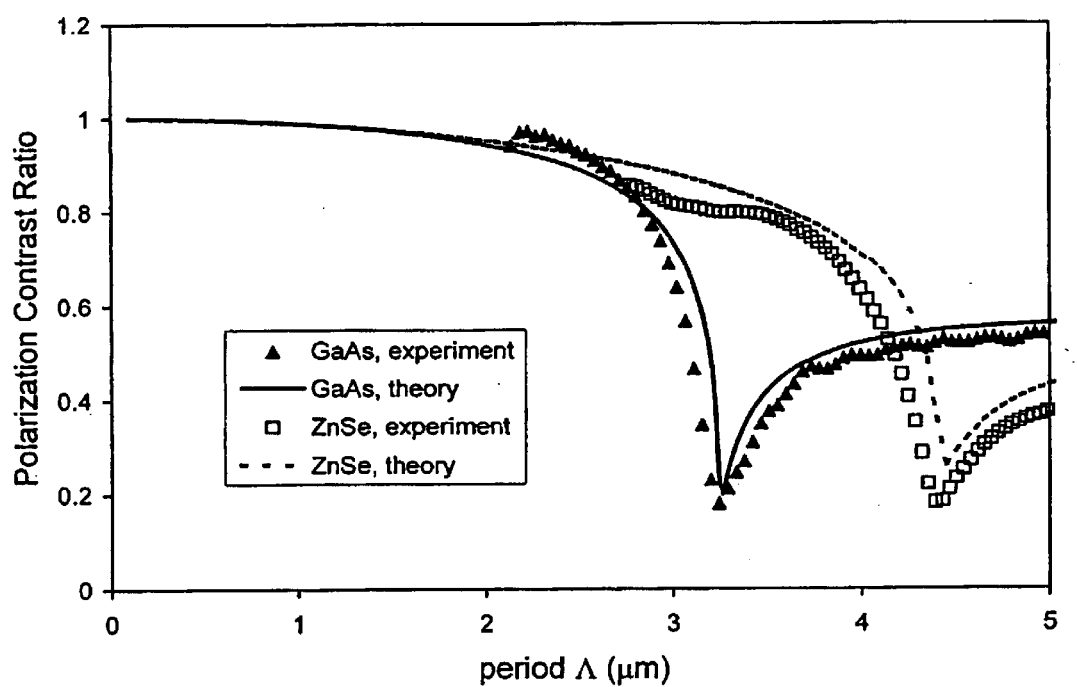
FIG. 2 shows the calculated and measured polarization contrast ratios of chirped gratings.

The calculated and measured PCRs for both ZnSe and GaAs gratings are shown in FIG. 2. The calculations were done using RCWA. The experimental results are in good agreement with the theory. FIG. 2 shows that when $\Lambda$ is small, the PCR for both gratings is close to 1, so that for any incident beam, the transmitted light is almost linearly polarized. However, as the period approaches $\lambda/n$, where $\lambda=10.6$ microns is the wavelength of the incident beam and n is the refractive index of the substrate (n=3.27 for GaAs; n=2.4 for ZnSe), the PCR drops sharply, reaching a minimum value of around 0.2. This minimum occurs at a period $\Lambda$ of 3.24 microns for GaAs and at a period $\Lambda$ of 4.4 microns for ZnSe. At this point, most of the transmitted light is in fact TE polarized, and the grating works as a reverse polarizer. After this dip, the PCR rises again to a value of around 0.6, and the grating no longer acts as an efficient polarizer.

The results of FIG. 2 now will be applied to the design of a space-variant polarizer, specifically, a grating with a transmission axis that varies linearly along the x-direction and that is described by the grating vector $$\vec{K}(x,y)=K_0(x,y)\cos(ax)\hat{x}+K_0(x,y)\sin(ax)\hat{y} \quad (3)$$

where $\hat{x}$ is a unit vector in the +x-direction, as before, and $\hat{y}$ is a unit vector in the +y direction. In order for this grating to be physically realizable, the grating vector must have a vanishing curl, so that $$\frac{\partial K_0}{\partial y}\cos(ax) = \frac{\partial K_0}{\partial x}\sin(ax) + \beta K_0 \cos(ax) \quad (4)$$

Equation (4) can be solved by equating the coefficients of cos(ax) and sin(ax) to zero independently, resulting in the grating vector $$\vec{K} = \frac{2\pi}{\Lambda_0}\exp(ay)[\cos(ax)\hat{x}+\sin(ax)\hat{y}] \quad (5)$$

where $\Lambda_0$ is the period at y=0. The corresponding grating function $\phi(x,y)$, whose gradient is the grating vector, is found by integrating the grating vector along an arbitrary path in the x,y plane:

$$\phi(x,y) = \frac{2\pi}{a\Lambda_0}\sin(ax)\exp(ay) \quad (6)$$

Two Lee-type (W. H. Lee, "Binary synthetic holograms", *Applied Optics* vol. 13 pp. 1677–1682 (1974)) binary chrome masks in accordance with the grating function of equation (6), and with a duty cycle of 0.5, were realized using high-resolution laser lithography. Following fabrication of the masks, one mask was transferred onto a 500 micron thick GaAs wafer substrate and the other mask was transferred onto a 2 mm thick ZnSe window substrate. The gratings were realized using the lift off technique described above for the chirped gratings. The GaAs grating was restricted to a 5 millimeter by 3 millimeter rectangle with a=−18° per millimeter, and $\Lambda_0$=2 microns so that β varied from −90° to 0° and Λ varied from 2 microns to 5.1 microns. On the ZnSe substrate, the grating consisted of a 5 millimeter by 2 millimeter rectangle, with a=−18° per millimeter and $\Lambda_0$=2.8 microns so that Λ varied from 2.8 microns to 5.1 microns. For both gratings the fabrication procedure resulted in a duty cycle of 0.55, with the metal stripes consisting of a titanium adhesion layer 10 nanometers thick and a 60 nanometer thick layer of gold. An antireflection coating was applied to the backside of the substrates.

Figure 3:
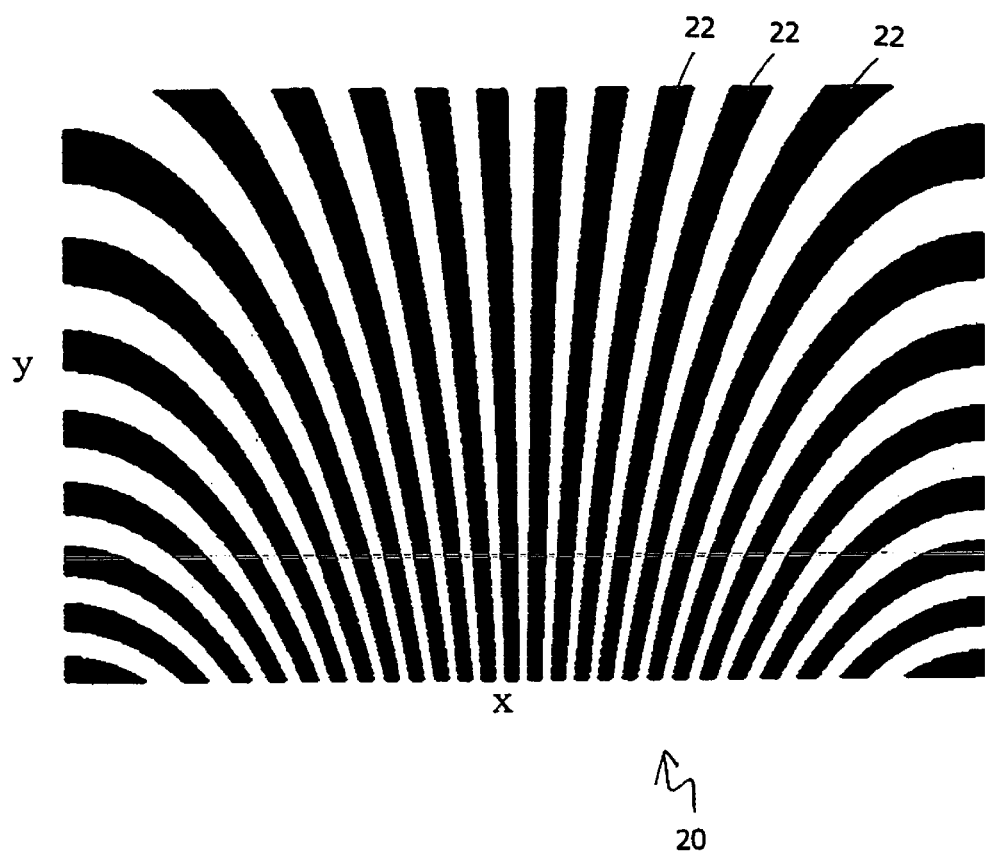
FIG. 3 is a schematic depiction of a mask for fabricating a grating with a transmission axis that varies linearly in a transverse direction.
Figure 4:
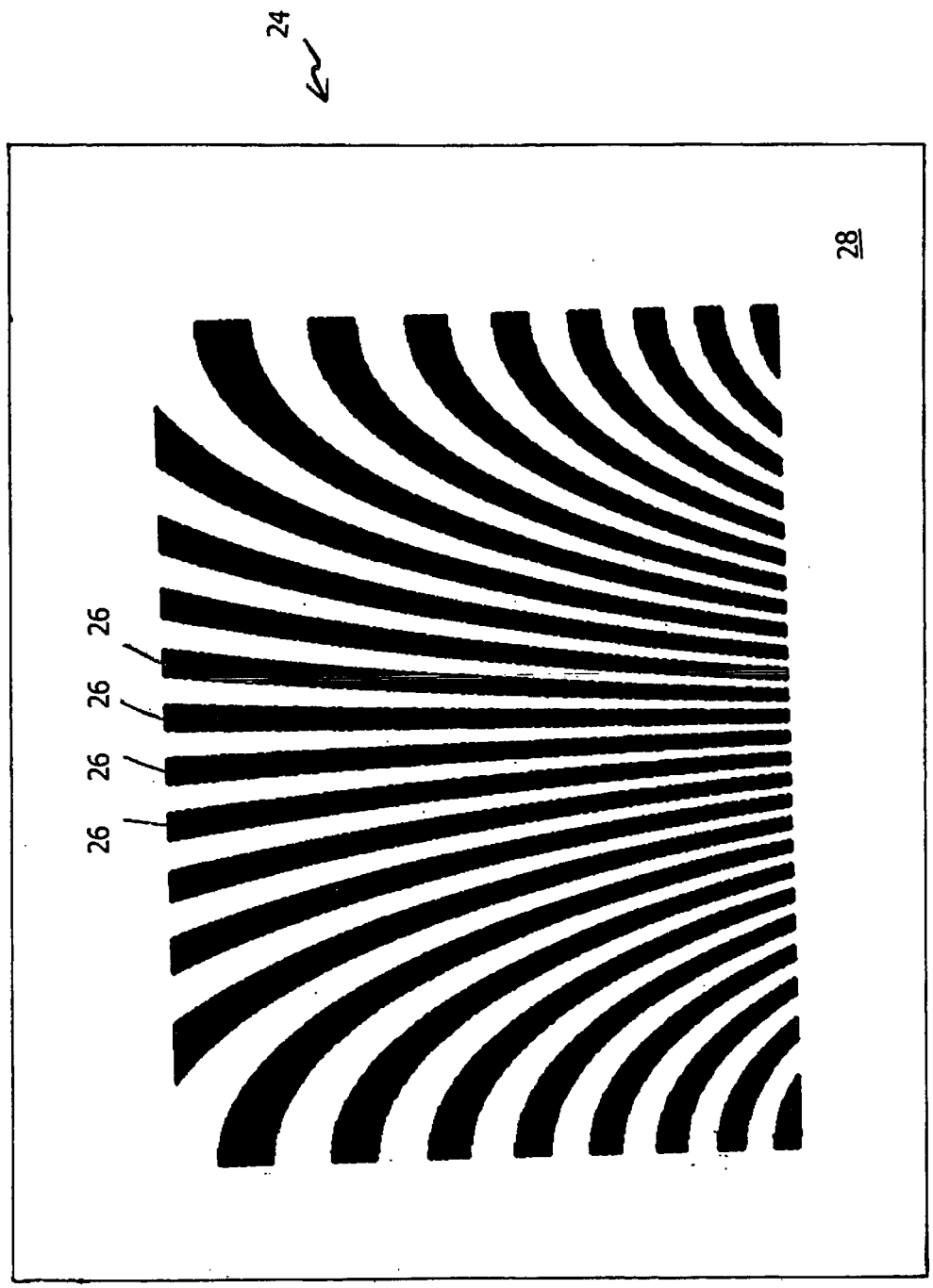
FIG. 4 is a schematic illustration of a grating fabricated using the mask of FIG. 3.

FIG. 3 is a schematic depiction of a mask 20 of this kind, with curved stripes 22. The transmission axis varies in the x-direction from 0° to 180°. This depiction is only schematic in the sense that the spacing of stripes 22, as shown in FIG. 3, is much wider than the spacing in the actual mask. For example, with $\Lambda_0$=2 microns and a mask width of 180°÷18°/mm=10 mm, there should be on the order of 500 stripes 22 in FIG. 3 rather than the 26 stripes 22 actually shown. FIG. 4 is a schematic illustration of the corresponding polarization grating 24, with electrically conducting stripes 26 on substrate 28. The continuity of grating 24 is evident.

Figure 5A:
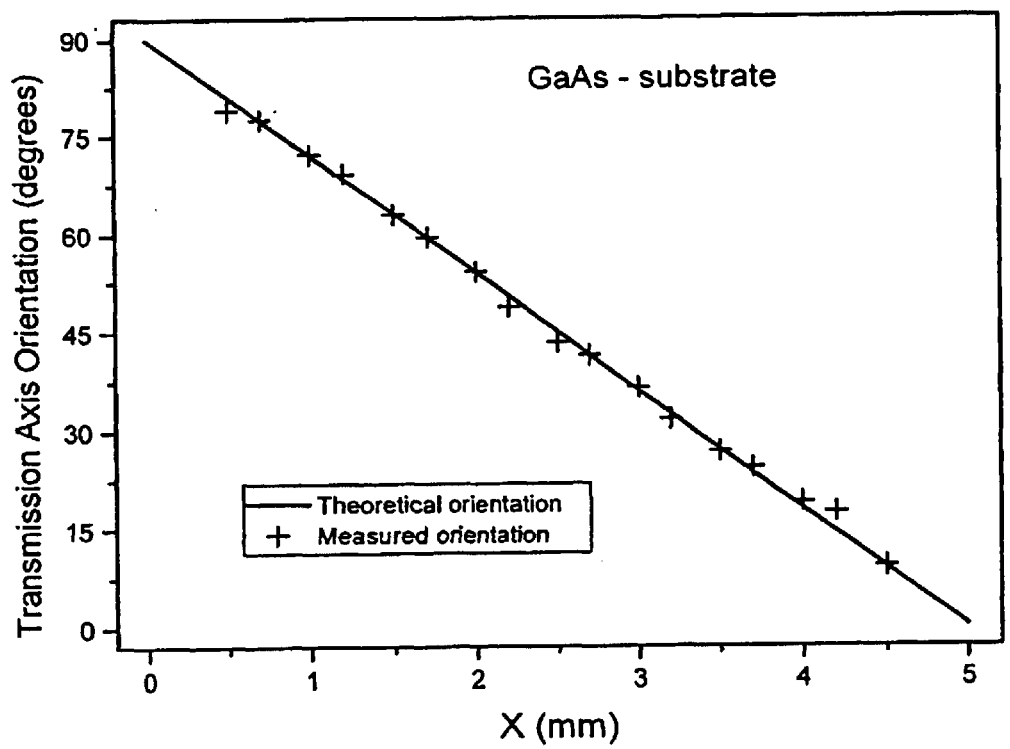
FIGS. 5A and 5B are plots of the transmission axes of two gratings of the type illustrated in FIG. 4, vs. the transverse coordinate.
Figure 5B:
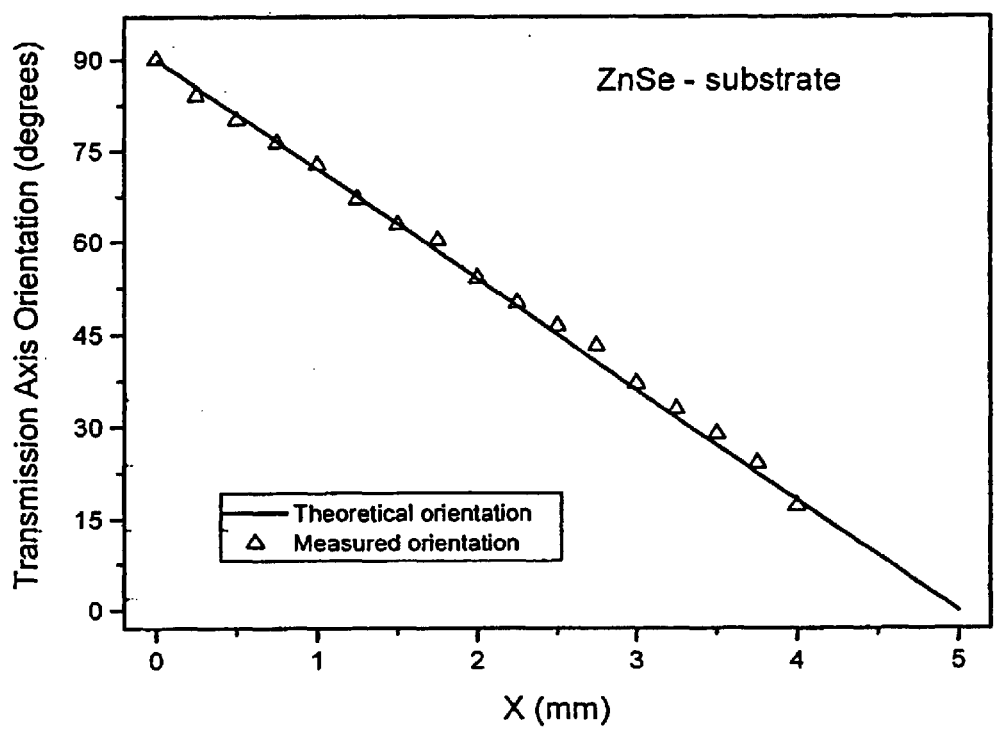

The two gratings were illuminated with linearly polarized light, using the experimental setup described above. The angle of polarization of the incoming beam was changed by rotating the half-wave plate, to locate the transmission axis along the grating. FIGS. 5A and 5B are plots of the direction of the transmission axis as a function of x for the two gratings. The direction of the transmission axis varies linearly with x, with a slope of 18° per millimeter.

Figure 6A:
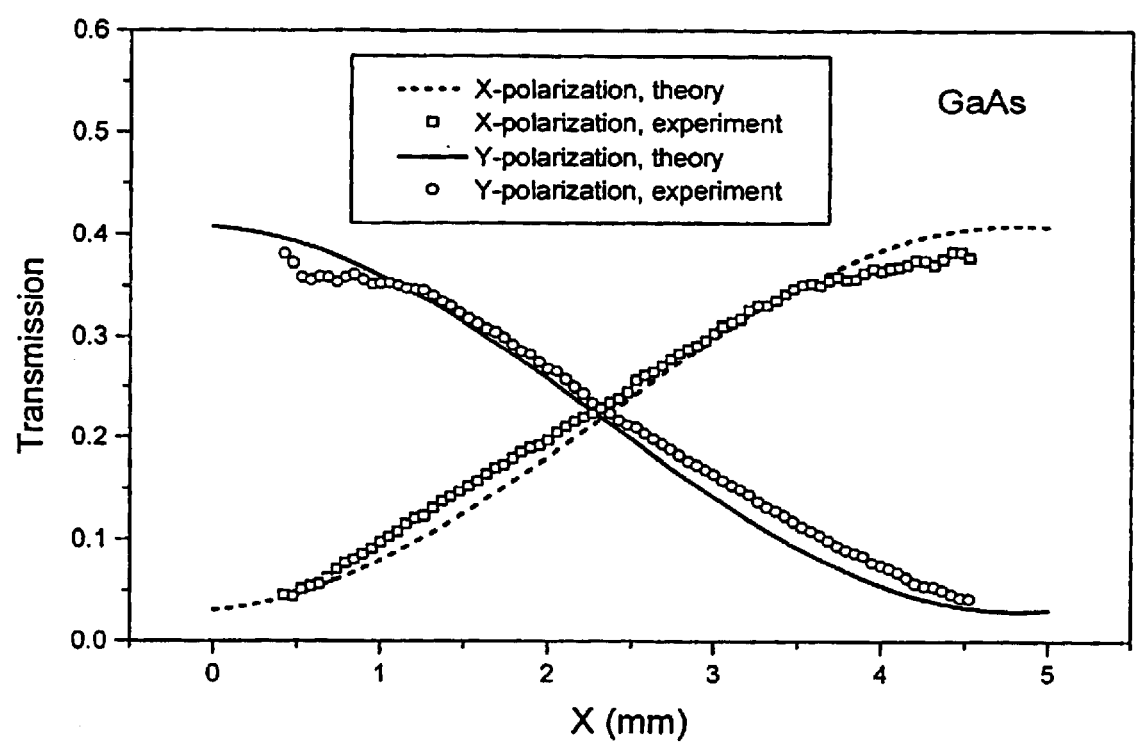
FIGS. 6A and 6B are plots of the transmitted intensity distributions of the gratings of FIGS. 5A and 5B, respectively, vs. the transverse coordinate.
Figure 6B:
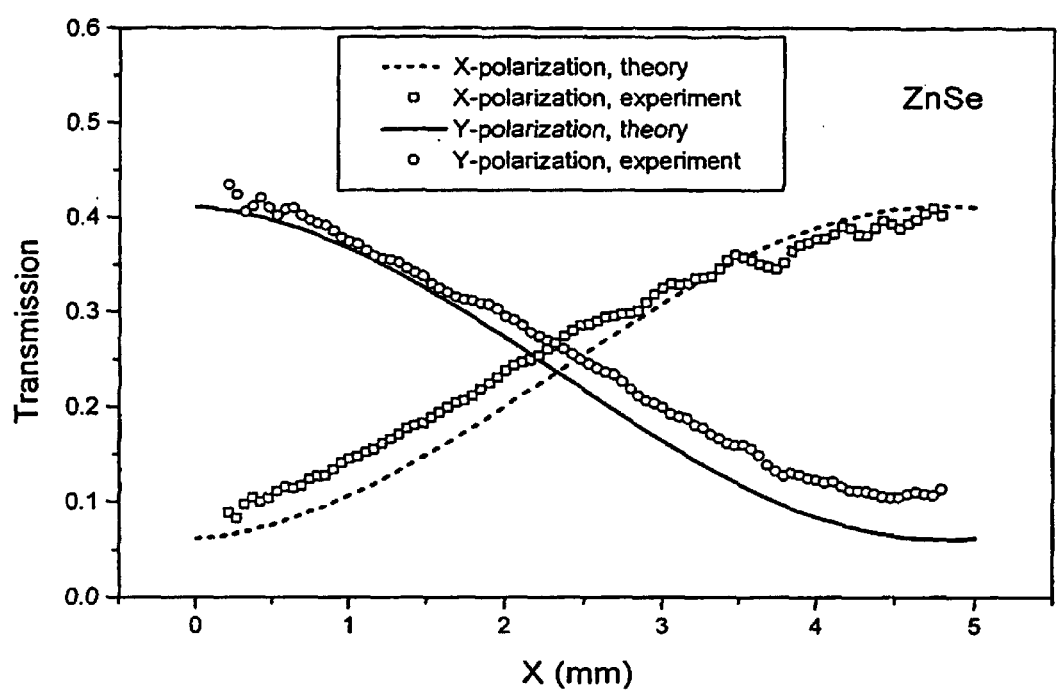

FIGS. 6A and 6B show the transmitted intensity distributions for the two gratings, as functions of x, for incident light linearly polarized in both the x direction and the y direction. The plots are of the average intensity measured at each x-coordinate over a small range of periods. For GaAs (FIG. 6A), this portion covered a range of periods from 2.4 microns to 2.8 microns. For ZnSe (FIG. 6B), the range was 3.2 microns to 3.45 microns. The experimental results fit the RCWA calculations.

To this point, the discussion has been of space-variant polarizers for which only the transmitted intensity is of interest. In some applications, as discussed below, it also is desirable to manipulate the exact polarization state of the transmitted beam. Because a certain amount of TE polarized light is transmitted through the grating, it can be expected that the resulting beam will not be TM polarized.

To determine the dependence of Δψ and of the ellipticity, tan(χ), on the period of the gratings, the Stokes parameters of the transmitted beam for the chirped gratings, when the incident beam was circularly polarized, were calculated and measured. The direction of the grating was chosen so that ψ and Δψ coincided. The experimental Stokes parameters were derived from four intensity measurements. For the first three intensity measurements, the transmitted light was passed through a polarizer whose axis was oriented at 0 degrees ($I_{0,0}$), at 90 degrees ($I_{90,0}$) and at 45 degrees ($I_{45,0}$). The fourth measurement was made by orienting the polarizer at 45 degrees, and inserting a quarter wave plate, with its fast axis at 0 degrees, between the polarizer and the grating ($I_{45,90}$). The Stokes parameters were calculated as:

$$S_0 = I_{0,0} + I_{90,0} \quad (7a)$$

$$S_1 = I_{0,0} - I_{90,0} \quad (7b)$$

$$S_2 = 2I_{45,0} - S_0 \quad (7c)$$

$$S_3 = S_0 - 2I_{45,90} \quad (7d)$$

The azimuthal angle and the ellipticity then were derived from the Stokes parameters according to the following equations:

$$\tan(2\psi) = S_2/S_1 \quad (8a)$$

$$\sin(2\chi) = S_3/S_0 \quad (8b)$$

Figure 7A:
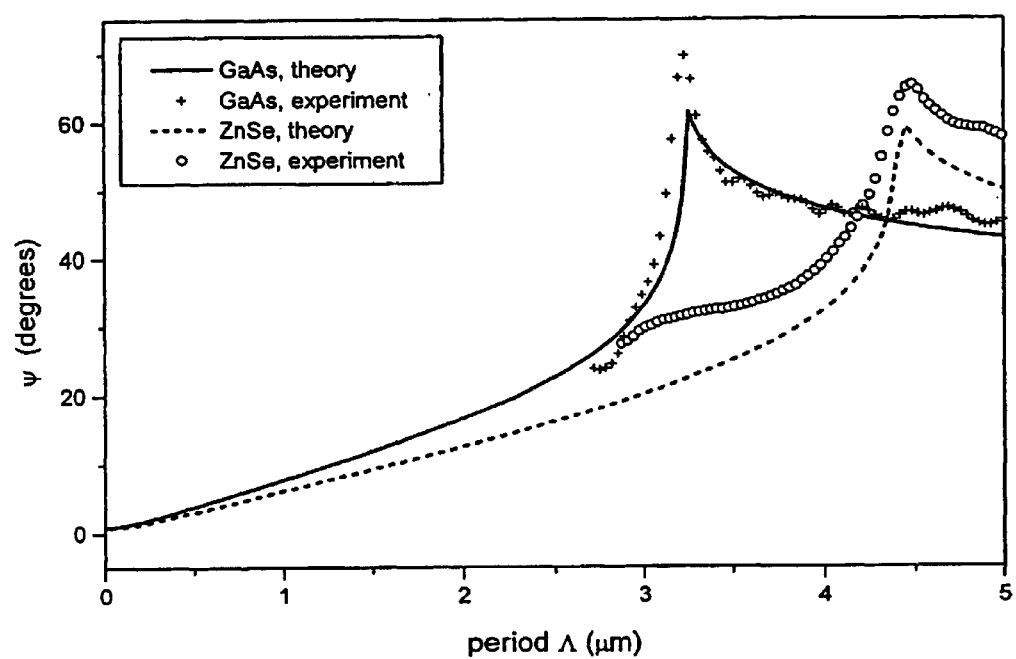
FIGS. 7A and 7B are plots of the azimuthal angles and ellipticities, respectively, of circular polarized light transmitted through the gratings of FIG. 2.
Figure 7B:
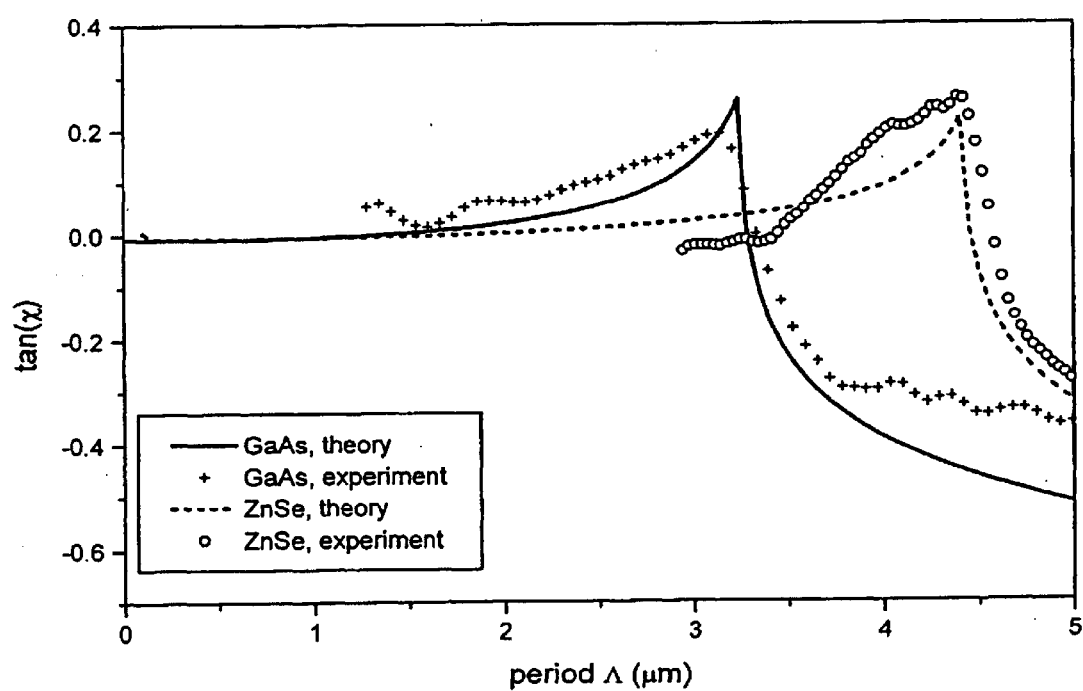

FIGS. 7A and 7B show the azimuthal angle and the ellipticity, respectively, of circularly polarized light at a wavelength of 10.6 microns transmitted through the GaAs and the ZnSe chirped gratings. Both azimuth and ellipticity display strong dependence on the period of the grating. In the region where the period is much smaller than the incident wavelength, both ψ and tan(χ) are close to zero, for both gratings, and the transmitted beam is nearly linearly polarized parallel to the grating vector. As the period becomes larger, both the azimuthal angle and the ellipticity increase. When the period approaches λ/n, where λ is the wavelength and n is the index of refraction of the substrate (λ/n=3.24 for GaAs; λ/n=4.4 for ZnSe), there is a sharp increase in the azimuthal angle and in the ellipticity. It follows that in order to transform circularly polarized light into a beam with a predetermined local azimuthal angle, the local grating direction must be period-dependent, and can be expressed as:

$$\beta(x,y) = \psi(x,y) - \Delta\psi(K_0(x,y)) \quad (9)$$

Combining this with the physical realizability condition that the curl of the grating vector must vanish gives the following grating equation:

$$\frac{\partial K_0}{\partial y}\cos(\beta) - K_0\sin(\beta)\left[\frac{\partial \psi}{\partial y} - \frac{\partial \Delta\psi}{\partial K_0}\frac{\partial K_0}{\partial y}\right] = \\ \frac{\partial K_0}{\partial x}\sin(\beta) + K_0\cos(\beta)\left[\frac{\partial \psi}{\partial x} - \frac{\partial \Delta\psi}{\partial K_0}\frac{\partial K_0}{\partial x}\right] \quad (10)$$

In order for a grating to satisfy this equation, the grating direction can not be chosen independently of the period.

Equation (10) now will be used to design a grating for transforming circularly polarized light into a beam with an azimuthal angle that varies linearly in the x-direction. For such an operator, the local grating direction should be $$\beta(x,y) = ax - \Delta\psi(K_0(x,y)) \quad (11)$$

Figure 8:
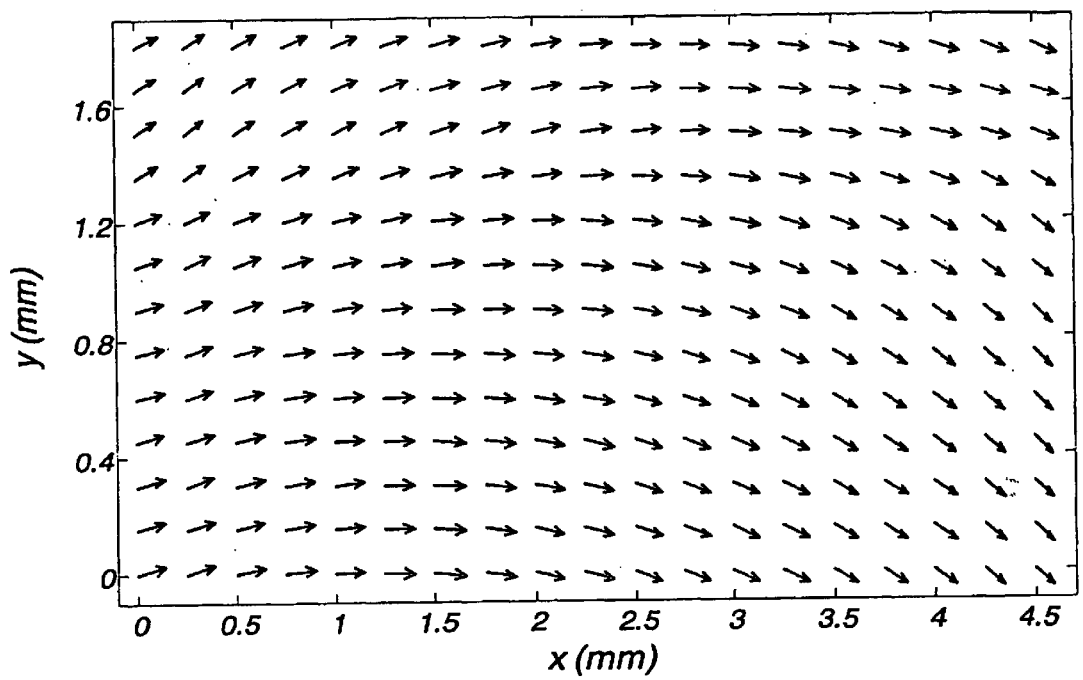
FIG. 8 is a plot of the azimuthal angle of a beam of circularly polarized light transmitted through the grating of FIG. 5B.

Under the zero-order approximation that $\Delta\psi$ is constant, this results in the grating described by equation (5). FIG. 8 is a plot of the experimental azimuthal angle of the beam transmitted through the ZnSe space-variant grating discussed above, when illuminated with circularly polarized light with a wavelength of 10.6 microns. For constant y (i.e., constant period), the azimuthal angle varies linearly in the x direction over a range of 90 degrees, as expected; but there also is an unwanted variation of azimuthal angle in the y direction. This is due to the insufficiency of the zero-order approximation in describing the dependence of $\Delta\psi$ on period.

A full space-variant polarization analysis can be used to verify the performance of a space-variant subwavelength grating. The method is based on RCWA and a Jones representation of the grating. The Jones matrix, for a subwavelength grating described by the grating vector $$\vec{K} = \frac{2\pi}{\Lambda}\hat{x},$$

is:

$$\hat{J}(\Lambda) = \begin{bmatrix} e_{xx} & 0 \\ 0 & e_{yy} \end{bmatrix} \quad (12)$$

where $$\vec{E}_x = \begin{bmatrix} e_{xx} \\ 0 \end{bmatrix}$$

and $$\vec{E}_y = \begin{bmatrix} 0 \\ e_{yy} \end{bmatrix}$$

and the complex Jones vectors for the transmitted fields for incident light, linearly polarized in the x-direction and in the y-direction, respectively. These fields can be calculated using RCWA. Once the matrix has been constructed, the Jones vector of the transmitted field for any incident polarization can be calculated as $\vec{E}_{out} = \hat{J}\vec{E}_{in}$. Furthermore, the Jones matrix for the same grating rotated by an arbitrary angle $\beta$ can be calculated as $$\hat{J}_{rot} = M(\beta)\hat{J}M^{-1}(\beta) \quad (13)$$

where $M(\beta)$ is a 2×2 rotation matrix:

$$M(\beta) = \begin{bmatrix} \cos\beta & -\sin\beta \\ \sin\beta & \cos\beta \end{bmatrix} \quad (14)$$

Note that $\hat{J}_{rot}$ is not a diagonal matrix. Applying equation (13) to space-variant gratings, in which the period and direction vary in the x,y plane, it turns out that such operators take the form $$\hat{J}(x,y) = M(\beta(x,y))\hat{J}(\Lambda(x,y))M^{-1}(\beta(x,y)) \quad (15)$$

which is a simple and elegant method for representing space-variant polarization gratings, enabling calculation of the transmitted field for any arbitrary incident polarization. The Stokes parameters then can be calculated from the Jones vector by use of the Coherence Matrix (T. Carozzi et al., "Parameters characterizing electromagnetic wave polarization", *Physical Review E* vol. 61 pp. 2024–2028 (2000)).

Figure 9A:
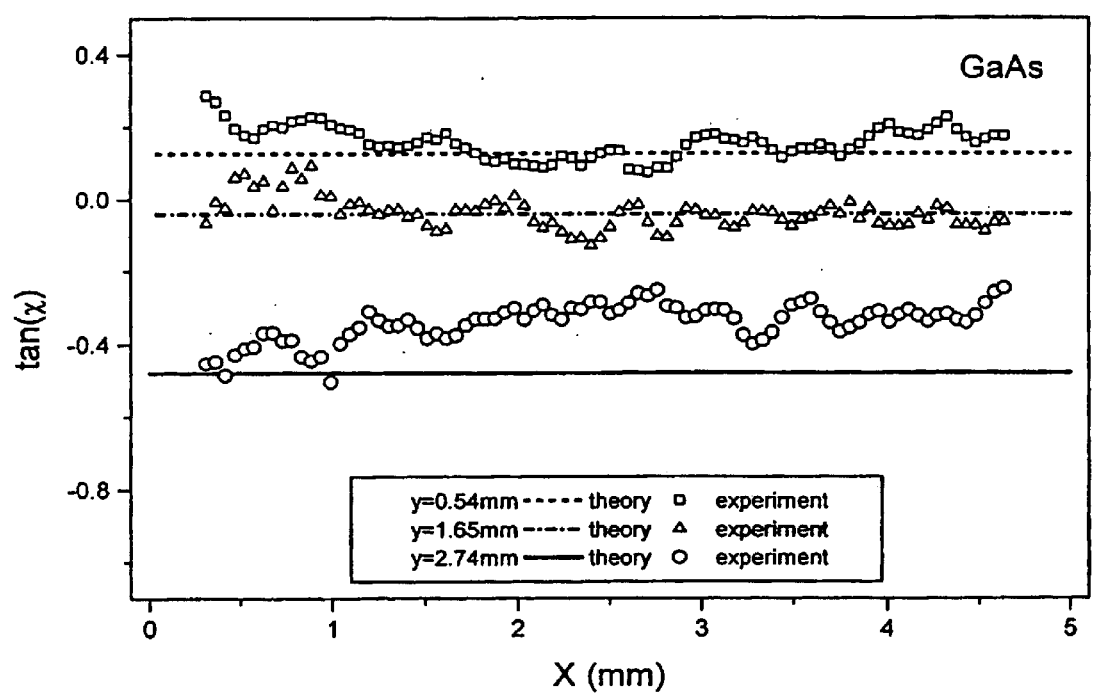
FIGS. 9A and 9B are cross sections of the ellipticity of beams of circularly polarized light transmitted through the gratings of FIGS. 5A and 5B, respectively.
Figure 9B:
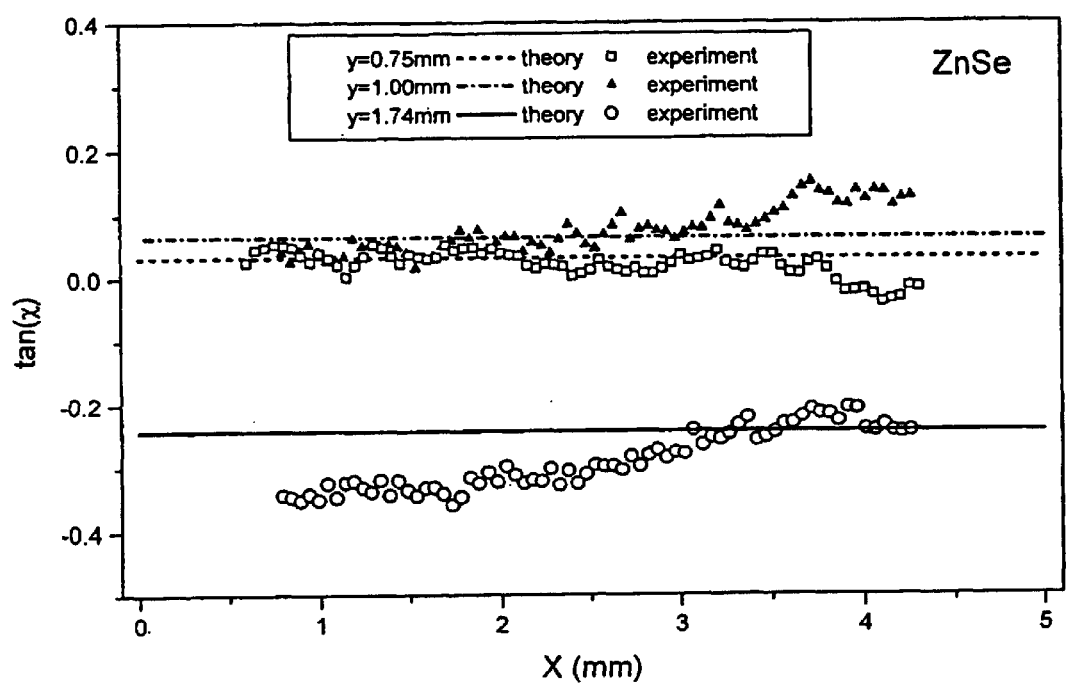
Figure 9C:
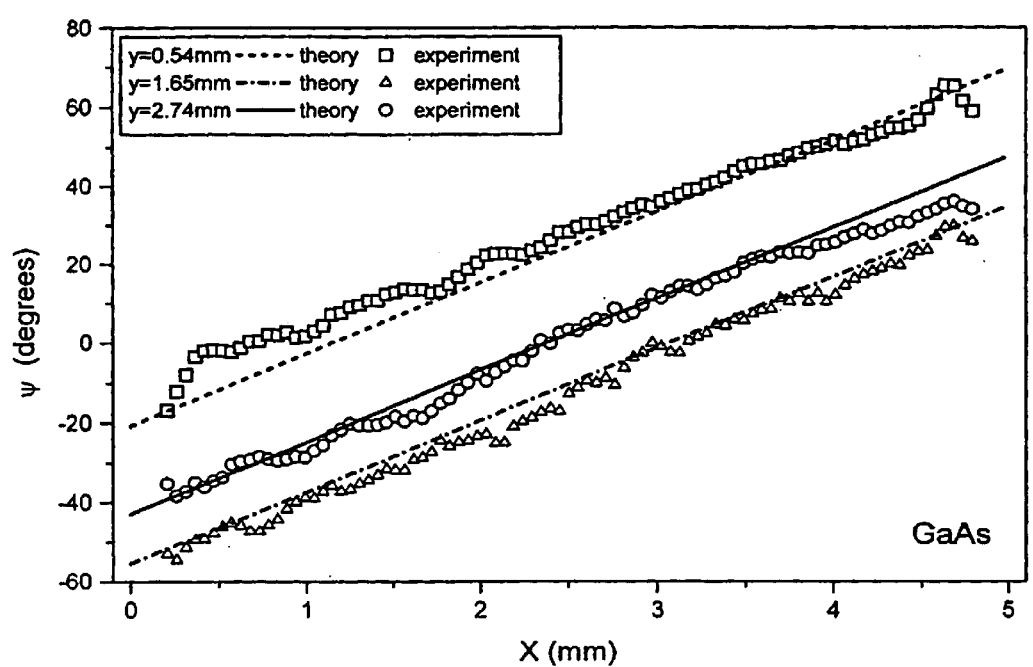
FIGS. 9C and 9D are cross sections of the azimuthal angles of beams of circularly polarized light transmitted through the gratings of FIGS. 5A and 5B, respectively.
Figure 9D:
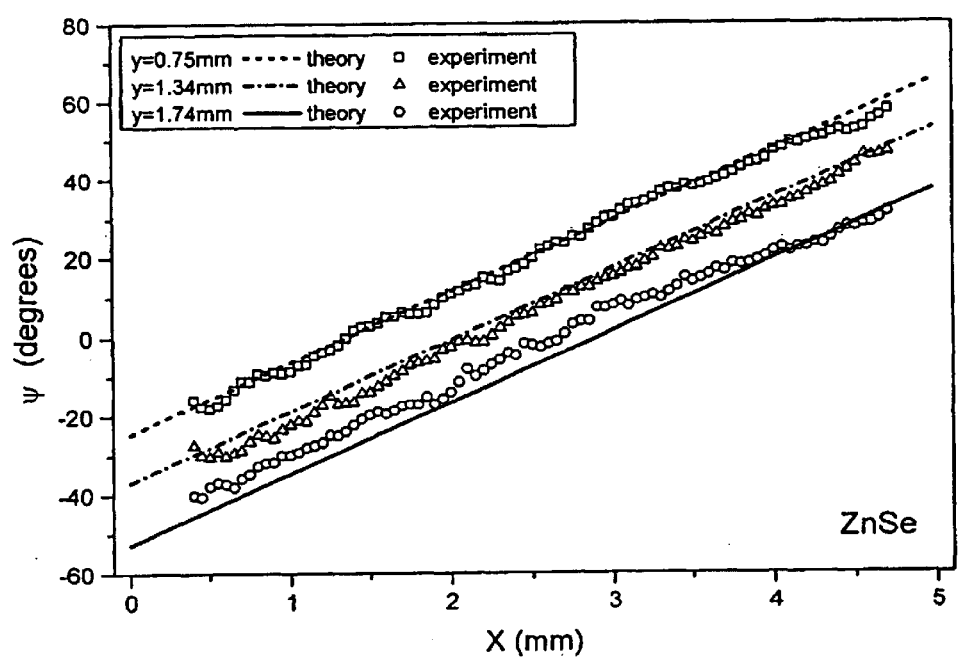
Figure 10:
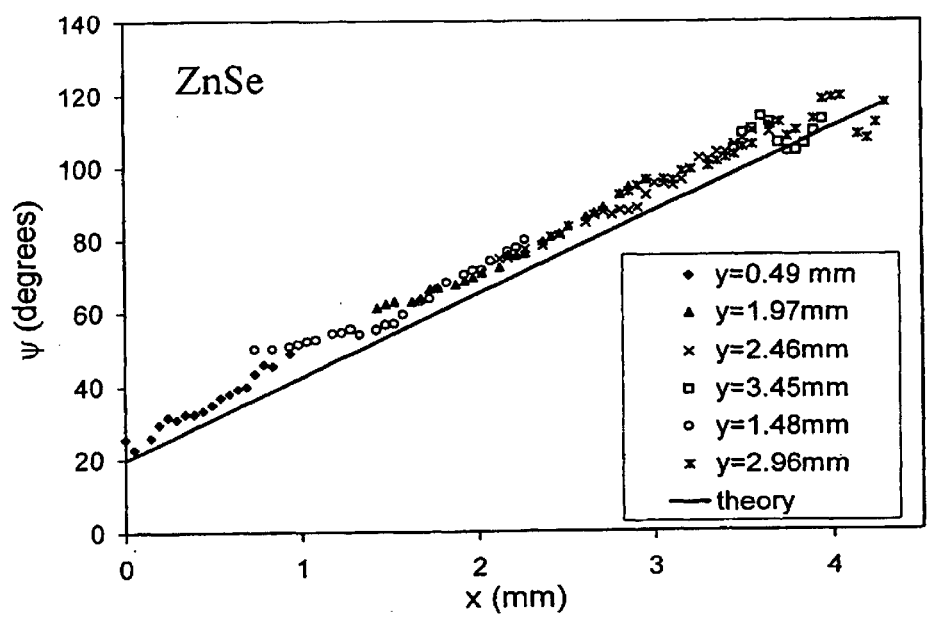
FIG. 10 is a plot of the azimuthal angle of a portion of a beam of circularly polarized light transmitted through the grating of FIG. 5B, vs. the transverse coordinate.

FIGS. 9A and 9B show cross sections of the measured and calculated ellipticity across the GaAs and ZnSe space-variant gratings, respectively. FIGS. 9C and 9D show cross sections of the measured and calculated azimuthal angle across the GaAs and ZnSe space-variant gratings, respectively. The calculations were done using equation (15). Examination of FIGS. 9A and 9B shows constant ellipticity for constant y, regardless of the direction of the grating. The azimuthal angle in FIGS. 9C and 9D follows straight parallel lines, indicating a linear variation of 90 degrees across the grating, and also highlighting the variation of azimuthal angle with period. This variation can be reduced by higher order solutions of equation (10). By applying a perturbation method to the solution of equation (10), it was found that a first order correction may be obtained by rotating the grating. Numerical simulations using RCWA and full space-variant polarization analysis based on equation (15) yield an optimal rotation angle of 36 degrees for the ZnSe grating and of 30 degrees for the GaAs grating. FIG. 10 shows the measured and calculated variation of the azimuthal angle along the x-axis for a small portion of the ZnSe grating when rotated by 36 degrees. The portion consisted of a 5 by 0.9 millimeter strip with periods from 3 microns to 4 microns. FIG. 10 shows a linear variation of the azimuthal angle along the x-axis and very little variation in the y direction, with good agreement between experiment and calculation. The calculated results reveal an average deviation of the azimuthal angle from a straight line of 0.6 degrees. The experimental deviation was 3.2 degrees. Additionally, taking into account an average ellipticity of 3.5 degrees reveals an overall polarization purity (percentage of power that is polarized in the desired direction) of 99.2%. A similar GaAs element yielded an average ellipticity of 6 degrees and an overall polarization purity of 98.6%.

The above discussion related to the imposition of a transversely varying polarization state on an input light beam. The imposition of a radially or azimuthally varying polarization state now will be discussed. For this purpose, the grating vector must be expressed in circular (r,θ) coordinates:

$$\vec{K} = K_0(r,\theta)\cos(\beta(r,\theta))\hat{r} + K_0(r,\theta)\sin(\beta(r,\theta))\hat{\theta} \quad (16)$$

where $\hat{r}$ is a unit vector in the radial direction and $\hat{\theta}$ is a unit vector in the azimuthal direction. Equation (9) becomes:

$$\beta(r,\theta) = \psi(r,\theta) - \Delta\psi K_0(r,\theta)) \quad (17)$$

Note that ψ now is measured with respect to the local radial direction.

FIGS. 11A–11D illustrates the four kinds of polarization states of interest: in-phase radial (FIG. 11A), anti-phase radial (FIG. 11B), in-phase azimuthal (FIG. 11C) and anti-phase azimuthal (FIG. 11D), with continuous electromagnetic fields. In FIGS. 11A and 1C, the fields at opposite sides of the center are in-phase and at any given instance the electric fields at those points are of equal magnitude and are oriented in the same direction. This is as opposed to the fields in FIGS. 11B and 11D, for which the electric fields at opposite sides of the circle are anti-phase, so that at any given instance, these fields possess the same magnitude and are oriented in opposite directions. Because of the symmetry of the beams, it is clear that the dark center of the anti-phase polarization is conserved during propagation, as opposed to the in-phase polarization, which displays a bright center in the far field. Both types of polarization can be produced by gratings of the present invention. If the incident beam is circularly polarized, then the grating should be followed by a spiral phase element to get anti-phase polarization.

The design of a grating for converting circularly polarized light into radially polarized light (ψ=0) now will be discussed. Requiring that the curl of the grating vector vanish gives the following differential equation:

$$\frac{\partial}{\partial r}[-rK_0(r,\theta)\sin[\Delta\psi(K_0(r,\theta))]] - \frac{\partial}{\partial \theta}[K_0(r,\theta)\cos[\Delta\psi(K_0(r,\theta))]] = 0 \quad (18)$$

from which $K_0(r,\theta)$ can be determined. Requiring that the curl of the grating vector vanish guarantees that the polarization of the resulting beam is continuous, and also ensures that the electromagnetic field defined by the local polarization and phase of the resulting beam is continuous, thereby eliminating diffraction associated with discontinuity of the wave front.

Equation (18) may be solved by separation of variables, under the constraint that $K_0(r,\theta)$ is real. It turns out that the period is independent of θ and that $K_0(r)$ can be found from the transcendental equation $$K_0(r) = K_0(r_0)\frac{r_0}{r}\frac{\sin[\Delta\psi(K_0(r_0))]}{\sin[\Delta\psi(K_0(r))]} \quad (19)$$

where $r_0$ and $K_0(r_0)$ are constants of integration that determine the geometry and local period of the grating. Using RCWA, $\Delta\psi(K_0)$ was calculated for a grating whose metal stripes consisted of 70 nanometers of gold on a GaAs substrate with a duty cycle of 0.5. Equation (19) was solved numerically using the calculated $\Delta\psi(K_0)$. The grating function ϕ was found by integrating the grating vector along an arbitrary path to yield $$\phi(r,\theta) = K_0(r,\theta)r_0 \sin[\Delta\psi(K_0(r_0))]\left\{\int^r \frac{ctg[\Delta\psi(K_0(r'))]}{r'}dr' + \theta\right\} \quad (20)$$

Continuity of this function requires that ϕ(r,θ)=ϕ(r,θ+2π)± 2πm where m is an integer. Therefore, $K_0(r_0)$ $r_0$ sin[Δψ($K_0$($r_0$))] must be an integer, which places a restraint on the choice of $r_0$ and $K_0(r_0)$. The equations for the azimuthal grating can be found by applying the same procedure with ψ=π/2. An accurate solution of equations (19) and (20) results in a grating design that converts circular polarization into a space-variant polarized beam for which the local azimuthal angle is exactly ψ(r,θ) at all points. The performance of the grating is limited only by the accuracy of the fabrication process.

Figure 12A:
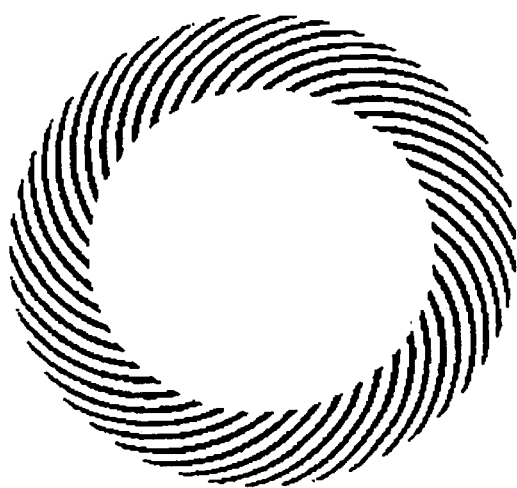
FIG. 12A is a schematic depiction of the geometry of a radial grating.
Figure 12B:
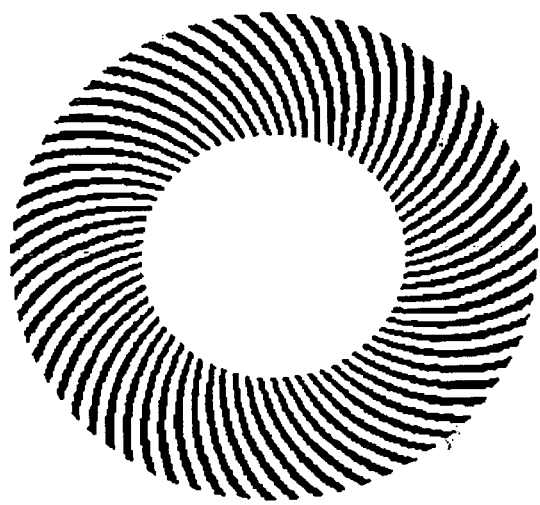
FIG. 12B is a schematic depiction of the geometry of an azimuthal grating.

Lee-type binary metal stripe gratings were realized for forming radial and azimuthal polarization, by the process described above for the transversely varying gratings. For the radial grating, $r_0$ was 5 millimeters and $\Lambda_0$ was 2 microns, so that r was between 3.3 millimeters and 5 millimeters and Λ was between 2 microns and 3.2 microns. For the azimuthal grating, $r_0$ was 2.4 millimeters and $\Lambda_0$ was 2 microns, so that r was between 2.4 millimeters and 5 millimeters and Λ was between 2 microns and 3.2 microns. FIG. 12A shows, schematically, the geometry of the radial grating. FIG. 12B shows, schematically, the geometry of the azimuthal grating.

Figure 13:
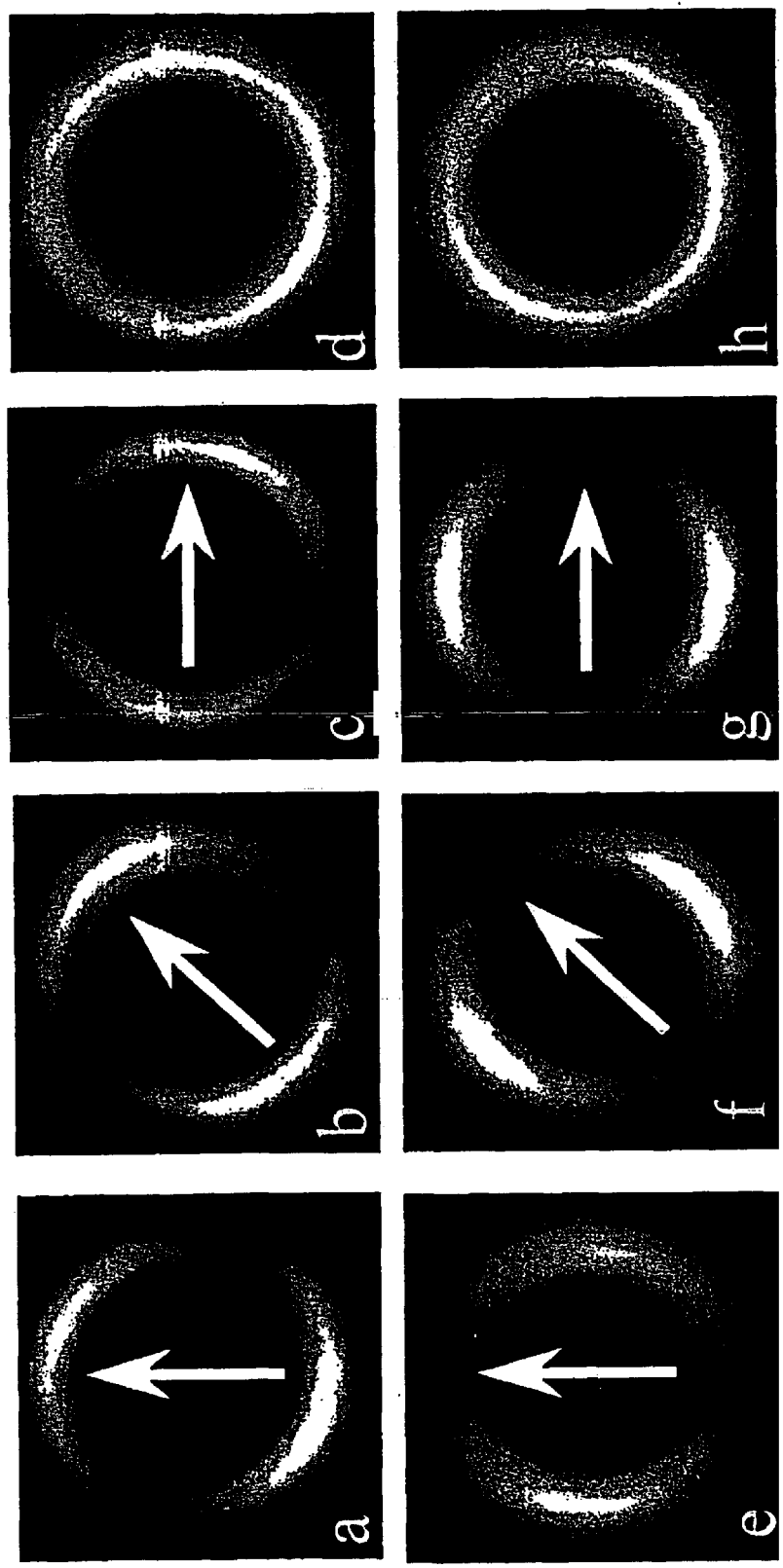
FIG. 13 shows measurements, of intensities of circularly polarized light transmitted through the gratings of FIGS. 12A and 12B, that were used to calculate the Stokes parameters of the transmitted beams.

The gratings of FIGS. 12A and 12B were illuminated with circularly polarized light at a wavelength of 10.6 microns from a carbon dioxide laser. Four measurements of the transmitted intensity were made. These measurements, which are shown in FIG. 13, were computed by imaging the gratings through a lens onto a Spiricon Pyrocam I camera. Pictures a–d refer to the radial grating of FIG. 12A. Pictures e–h refer to the azimuthal grating of FIG. 12B. The measurements of pictures a–c and e–g were made after passing the light through a polarizer oriented horizontally (a,d), diagonally at 45 degrees (b,e) and vertically (c,f). The measurements of pictures d and h involved passing the light through a quarter wave plate whose fast axis was at 0 degrees and then through a polarizer at 45 degrees. The arrows in pictures a–c and e–g indicate the transmission axis of the polarizer for those measurements. The four measurements for each grating then were used to calculate the Stokes parameters $S_0$, $S_1$, $S_2$ and $S_3$ for each point on the resulting beam, from which the local ellipticity and azimuthal angle were obtained using equations (8a) and (8b). For the radial grating of FIG. 12A, the average deviation of the azimuthal angle from the desired ψ was 9.8 degrees, and the average ellipticity tan(χ) was −0.12, for an overall polarization purity of 95.7%. For the azimuthal grating of FIG. 12B, the average deviation of the azimuthal angle from the desired ψ was 5.5 degrees, and the average ellipticity tan(χ) was −0.1, for an overall polarization purity of 98.2%. The deviation from the desired polarization is mainly a result of an increase in duty cycle during fabrication, which caused a deviation of $\Delta\psi(K_0)$ from what was expected.

Figure 14:
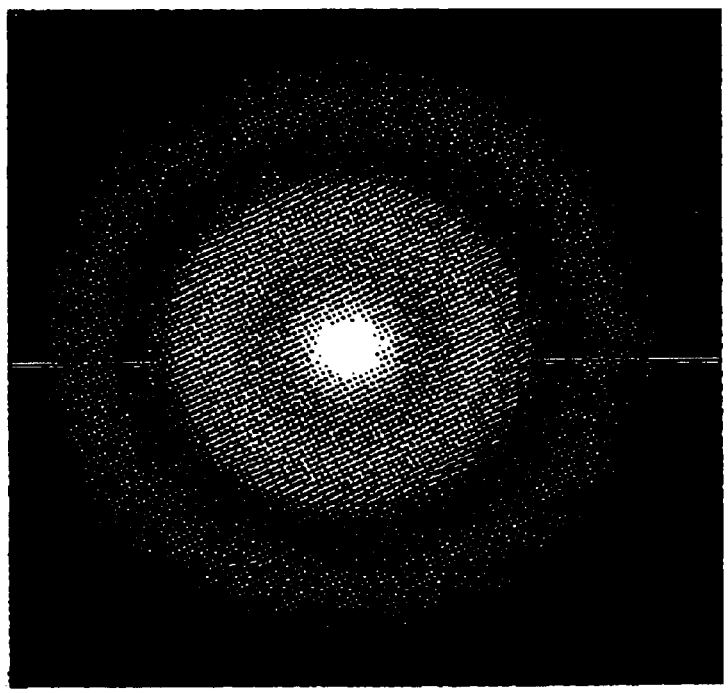
FIG. 14 is a far field image of the beam transmitted through the grating of FIG. 12A.

FIG. 14 shows a far field image of the radially polarized beam. The bright center shows that that the beam is in-phase polarized.

Three applications of the polarization grating of the present invention now will be discussed.

The first application is to polarimetry, i.e., the measurement of the polarization state of a light beam. Such measurements are used for a large range of applications, including ellipsometry (A. N. Naciri et al., "Spectroscopic generalized ellipsometry based on Fourier analysis", *Applied Optics* vol. 38 pp. 4802–4811 (1999)), biosensing (V. Sankaran et al., "Comparison of polarized light propagation in biological tissues and phantoms, *Optics Letters* vol. 24, pp. 1044–1046 (1999)), quantum computing (M. Koashi et al., "Probabilistic manipulation of entangled photons", *Physical Review A* vol. 63 article no. 030301 (2001)) and optical communications (P. C. Chou et al., "Real time principal state characterization for use in PMD compensators", *IEEE Photon Technology Letters* vol. 13 pp. 568–570 (2001)). One commonly used method of polarimetry is to measure the time dependent signal when the beam is transmitted through a rotating polarizer or quarter wave plate (E. Collet, *Polarized Light* (Marcel Dekker, New York, 1993) pp. 103–107). By Fourier analysis of this signal, the Stokes parameters of the beam can be derived. This method is relatively slow, because it relies on a series of consecutive measurements. This makes this method difficult to us in applications that require the measurement of dynamic changes in polarization, such as polarization mode dispersion compensation in optical communications.

The polarization grating of the present invention (specifically, the grating whose transmission axis varies periodically in the x direction) can be used to implement the space domain analog of the rotating polarizer method. By performing a Fourier analysis of the transmitted intensity, the polarization state of the incident beam can be determined in real time.

The polarization state of light can be described as a Stokes vector $(S_0, S_1, S_2, S_3)^T$. In general, $S_0^2 \geq S_1^2 + S_2^2 + S_3^2$, with equality holding only for a fully polarized beam. In the Stokes representation, a polarizer with complex amplitude transmission coefficients $t_x$, $t_y$ is represented by the 4×4 Mueller matrix:

$$P = \frac{1}{2}\begin{bmatrix} |t_x|^2+|t_y|^2 & |t_x|^2-|t_y|^2 & 0 & 0 \\ |t_x|^2-|t_y|^2 & |t_x|^2+|t_y|^2 & 0 & 0 \\ 0 & 0 & 2\mathrm{Re}(t_x t_y^*) & -2\mathrm{Im}(t_x t_y^*) \\ 0 & 0 & 2\mathrm{Im}(t_x t_y^*) & 2\mathrm{Re}(t_x t_y^*) \end{bmatrix} \quad (21)$$

and a polarizer rotated by an angle β is described by the matrix $$M(\beta) = R(-\beta) P R(\beta) \quad (22)$$

where $$R(\beta) = \begin{bmatrix} 1 & 0 & 0 & 0 \\ 0 & \cos 2\beta & \sin 2\beta & 0 \\ 0 & -\sin 2\beta & \cos 2\beta & 0 \\ 0 & 0 & 0 & 1 \end{bmatrix} \quad (23)$$

is the Mueller matrix for a rotator.

As noted above, Gori proposed polarimetry using a polarizer similar to the polarization grating of the present invention, but with a stepwise laterally continuous transmission axis, with measurements in the far field. According to the present invention, the measurements are made in the near field.

Based on equation (22), the Mueller matrix for a polarization grating whose grating function is given by equation (6) (β=ax) is M(x)=R(ax)PR(-ax). Suppose that a monochromatic plane wave in an arbitrary state of polarization is incident on such a polarization grating. The polarization state of the transmitted beam is space varying in general. The Stokes vector of the transmitted beam is $(S_0'(x), S_1'(x), S_2'(x), S_3'(x))^T = M(x)(S_0, S_1, S_2, S_3)^T$. In particular, the intensity transmitted through the polarization grating is $$S_0'(x) = \{AS_0 + B[S_1 \cos(2ax) + S_2 \sin(2ax)]\}/2 \quad (24)$$

where $A = |t_x|^2 + |t_y|^2$ and $B = |t_x|^2 - |t_y|^2$. Equation (24) describes a truncated Fourier series whose coefficients depend on the Stokes parameters of the incident beam. Therefore a simple Fourier analysis yields these parameters as:

$$S_0 = \frac{a}{\pi A} \int_{x=0}^{2\pi/a} S_0'(x) dx \quad (25a)$$

$$S_1 = \frac{a}{\pi B} \int_{x=0}^{2\pi/a} S_0'(x) \cos(2ax) dx \quad (25b)$$

$$S_2 = \frac{a}{\pi B} \int_{x=0}^{2\pi/a} S_0'(x) \sin(2ax) dx \quad (25c)$$

Furthermore, for polarized light, $S_3 = \sqrt{S_0^2 - S_1^2 - S_2^2}$ which enables full analysis of the incident polarization.

The GaAs grating, that was fabricated in accordance with the grating function of equation (6), as discussed above, was illuminated with linearly polarized light at a wavelength of 10.6 microns. The azimuthal angle of the incident beam was varied using a half wave plate (HWP). The transmitted intensity was imaged through a lens and recorded by a Spiricon Pyrocam I camera.

Figure 15A:
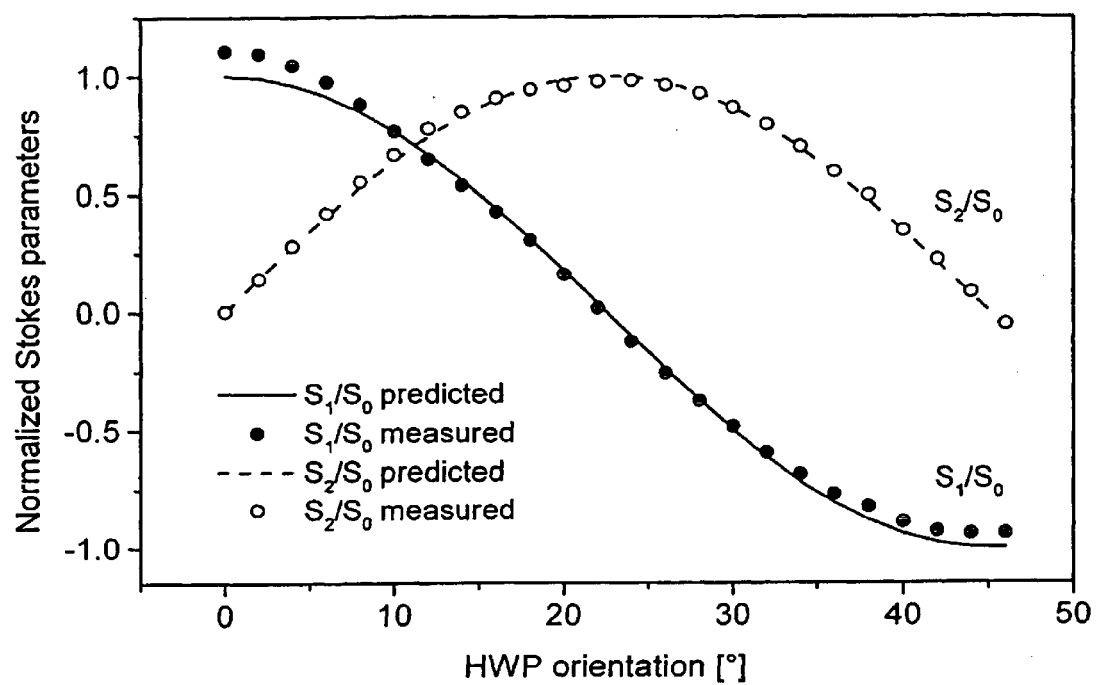
FIG. 15A shows normalized Stokes parameters of linearly polarized beams, as predicted and as determined from measurements of the laterally varying intensity of the beam after traversing the grating of FIG. 4.
Figure 15B:
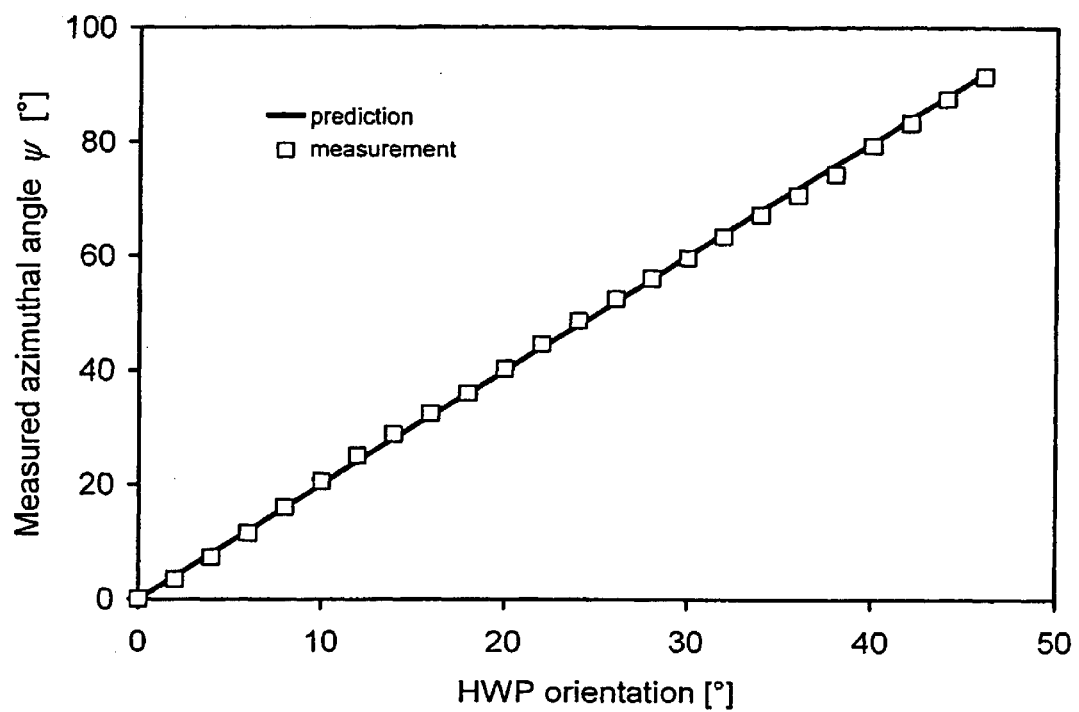
FIG. 15B shows azimuth angles of linearly polarized beams, as predicted and as determined from measurements of the laterally varying intensity of the beam after traversing the grating of FIG. 4.

FIGS. 15A and 15B show measured and predicted normalized Stokes parameters and azimuth angles, respectively, at various settings of the HWP.

The same grating can be used to evaluate not only polarized light but partially polarized light as well. If a quarter wave plate (QWP) is placed in front of the space-variant polarization grating, then the transmitted intensity is $$S_0'(x) = \{AS_0 + B[S_1 \cos(2ax) - S_3 \sin(2ax)]\}/2 \quad (26)$$

which enables the direct measurement of $S_3$. Therefore, if a QWP is placed over part of the polarization grating, all four Stokes parameters can be measured simultaneously, thereby enabling the analysis of partially polarized light. A QWP can be realized as a dielectric subwavelength grating (A. G. Lopez and H. G. Craighead, "Wave plate polarizing beam splitter based on a form birefringent multiplayer grating", *Optics Letters* vol. 23 pp. 1627–1629 (1998)).

Figure 16:
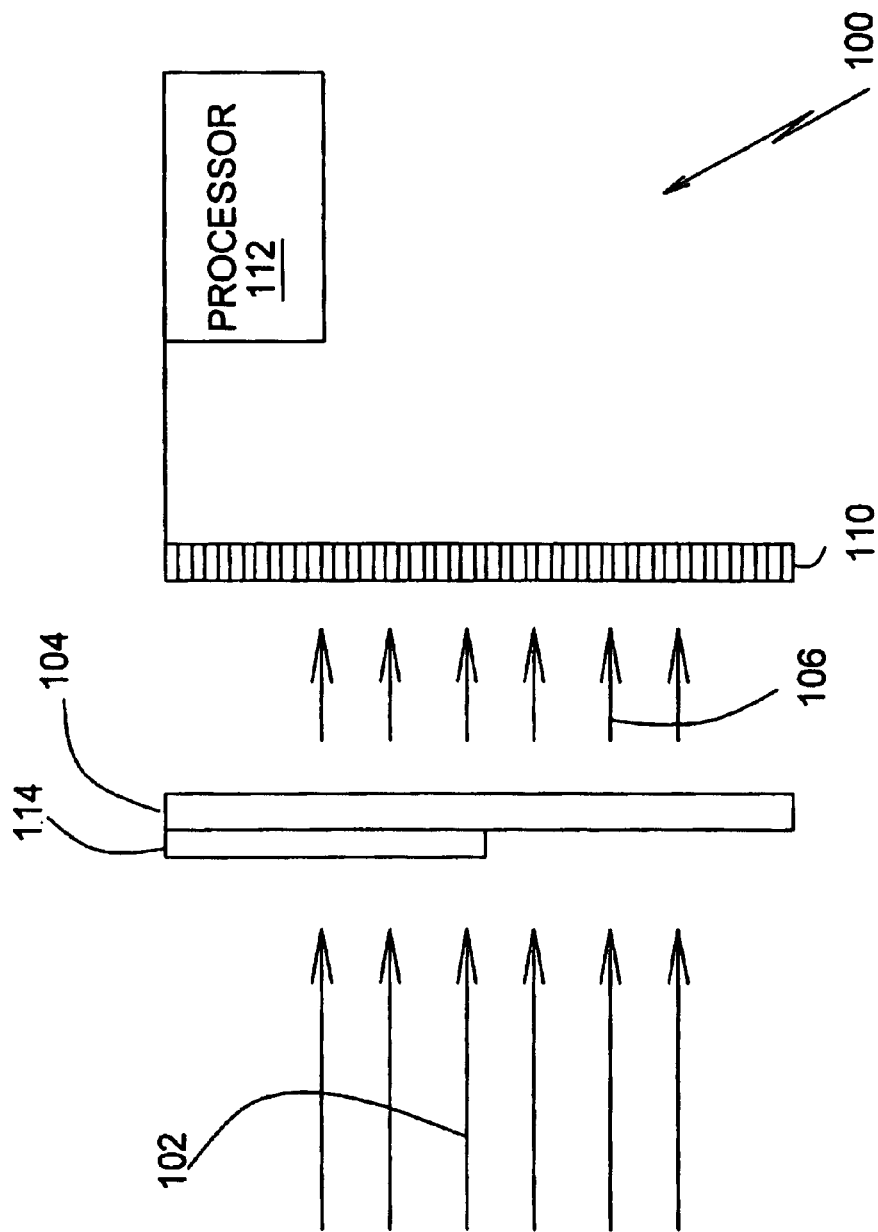
FIGS. 16 and 17 are schematic diagrams of apparati of the present invention for measuring the polarization state of an incident light beam.

FIG. 16 is a schematic diagram of an apparatus 100 for measuring the polarization state of an incident light beam 102. Light beam 102 is incident on a transmission polarization grating 104 of the present invention that is fabricated in accordance with the grating function of equation (6). Half of polarization grating 104 is covered by a QWP 114 to enable the measurement of the polarization state of partially polarized light, as described above. The transmitted beam 106 that emerges from polarization grating 104 is incident on a CCD array 110 that is parallel to the x axis of polarization grating 104. CCD array 110 is positioned sufficiently close to polarization grating 104 that the intensities measured by CCD array 110 are near-field intensities. The intensities measured by CCD array 110 are read by a processor 112. Processor 112 effects the transformations of equations (25) to derive the Stokes parameters of incident beam 102.

In FIG. 16, CCD array 110 is illustrative, not limitative. Any suitable imaging array, for example a pyroelectric array, may be used to measure the laterally varying intensity of transmitted beam 106.

Figure 17:
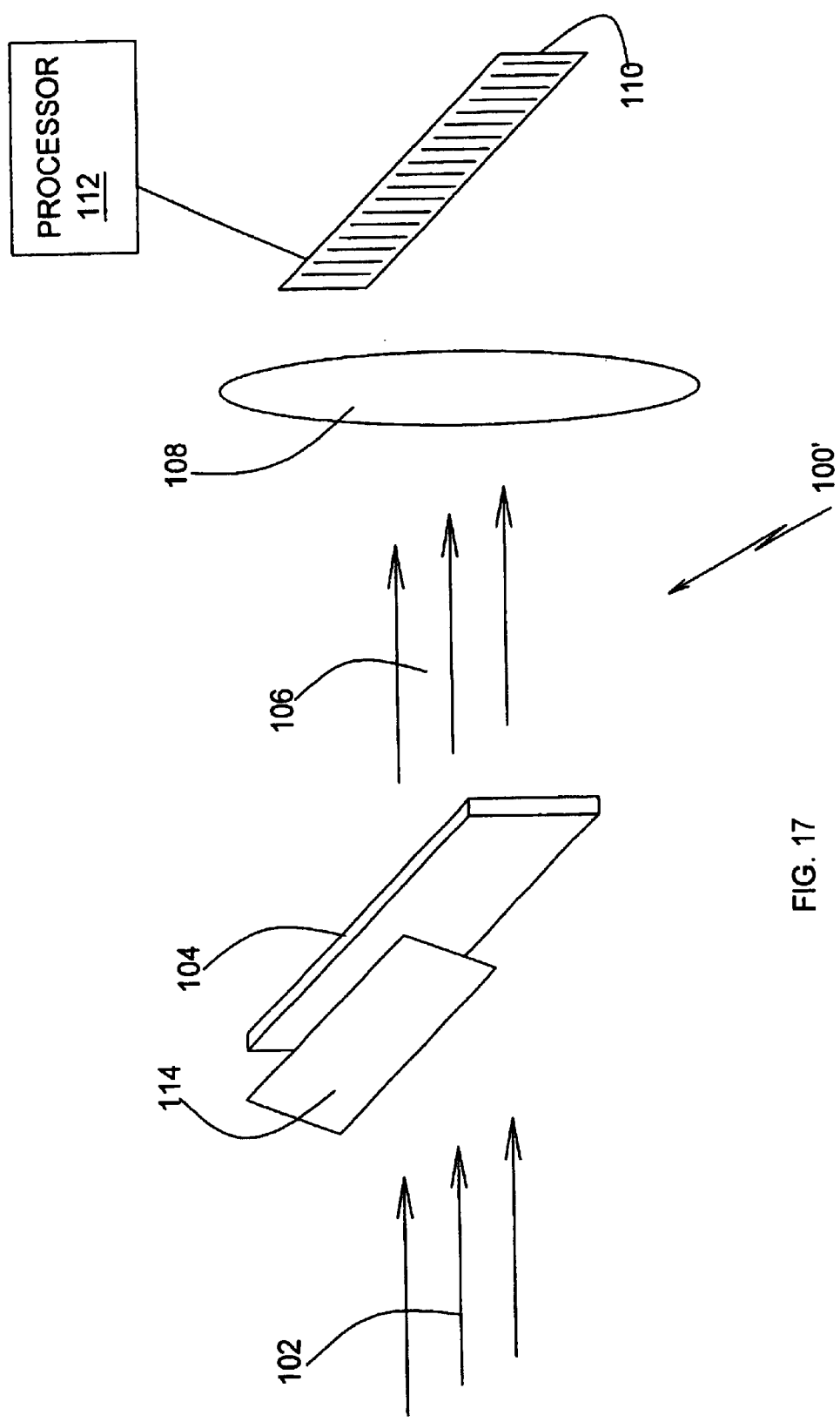

FIG. 17 is a schematic diagram of another apparatus 100' for measuring the polarization state of incident light beam 102. The difference between apparatus 100 and apparatus 100' is that apparatus 100' includes focusing optics 108 (represented schematically by a convex lens) for focusing transmitted beam 106 onto CCD array 110.

It will be readily apparent that, with appropriate changes in the optical configurations of apparati 100 and 100', a reflection grating can be substituted for transmission grating 104.

Figure 18:
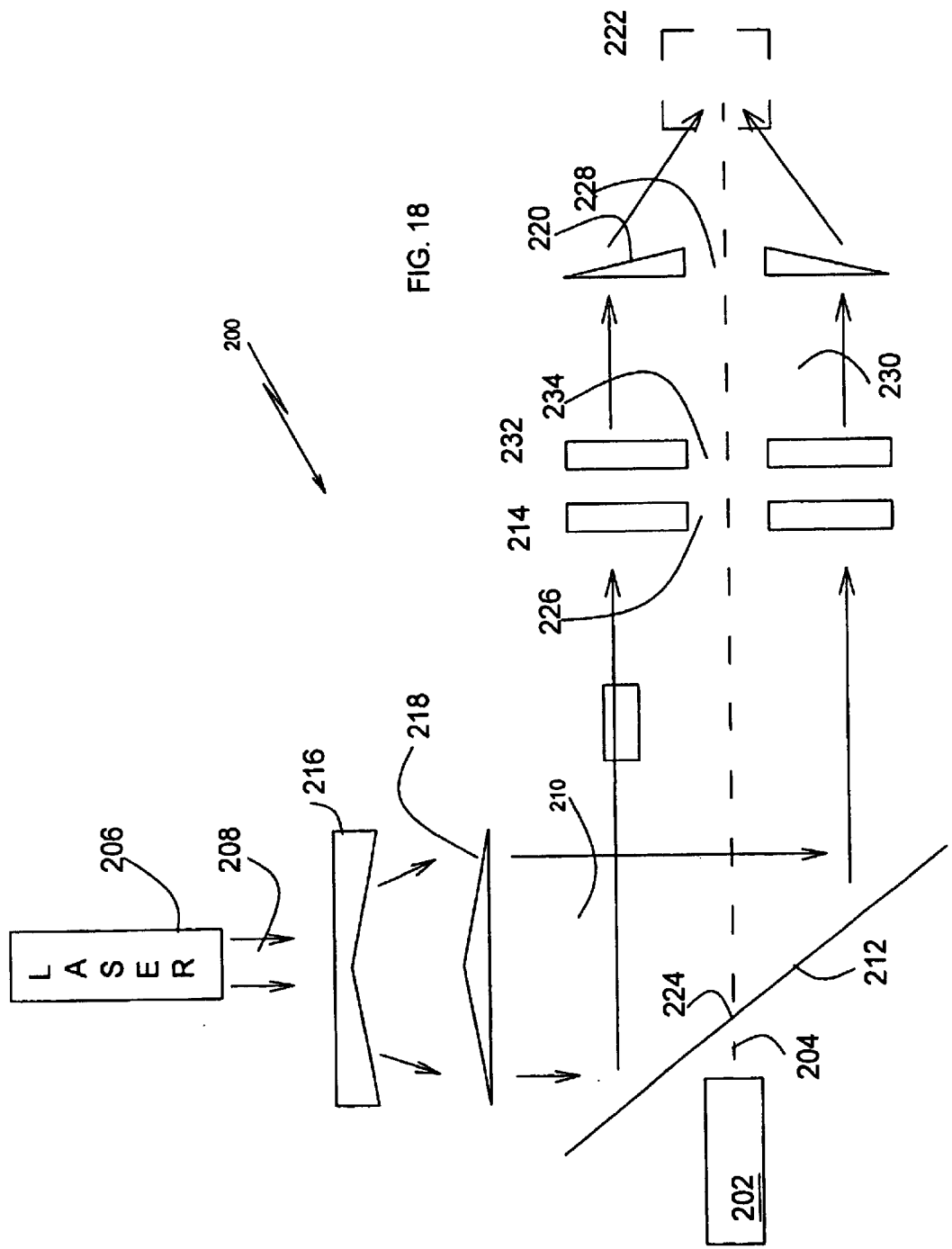
FIG. 18 is a schematic diagram of an inverse Cerenkov accelerator of the present invention.

The second application is to the acceleration of subatomic particles. FIG. 18 is a schematic diagram of an inverse Cerenkov accelerator 200 of the present invention. Accelerator 200 is similar to the accelerators described by Y. Liu et al. in "Vacuum laser acceleration using a radially polarized $CO_2$ laser beam", *Nuclear Instruments and Methods in Physics Research A* vol. 424 pp. 296–303 (1999) and by I. V. Pogorelsky et al. in "$CO_2$ laser technology for advanced particle accelerators", a web page whose URL is http://nslsweb.nsls.bnl.gov/AccTest/publications/co2_laser_tech.htm.

A source 202 emits a beam 204 of electrons that are to be accelerated. A carbon dioxide laser 206 emits a coherent beam 208 of 10.6 micron light. Beam 208 is converted into an annular light beam 210 by a negative axicon lens 216 and a positive axicon lens 218. An annular mirror 212 is placed to reflect annular light beam 210 parallel to electron beam 204, with electron beam 204 traversing an aperture 224 in mirror 212 so that electron beam 204 travels along the axis of annular light beam 210. A polarization grating 214 of the present invention, similar to the radial grating described above, followed by a spiral phase element 232 with a phase function $\exp[-i\theta(x,y)]$ (R. Oron et al., "Continuous phase elements can improve laser beam quality", *Optics Letters* vol. 25 pp. 939–941 (2000)), convert annular light beam 210 into an anti-phase, radially polarized annular light beam 230. (Note that in the absence of spiral phase element 232, polarization grating 214 would convert light beam 210 into an in-phase, radially polarized light beam.) Alternatively, polarization grating 214 and spiral phase element 232 are placed in the optical path from laser 206 to mirror 212, for example between laser 206 and axicon lens 216. Light beam 230 is focused onto a focal region 222 by a positive axicon lens 220. Meanwhile, electron beam 204 traverses apertures 226 and 228 in polarization grating 214 and lens 220, respectively, to enter focal region 222. In focal region 222, the longitudinal component of the electric field of light beam 230 accelerates the electrons of electron beam 204 towards the right.

The third application is to the cutting of a workpiece. As described by V. G. Niziev and A. V. Nesterov in "Influence of beam polarization on laser cutting efficiency", *Journal of Physics D: Applied Physics* vol. 32 pp. 1455–1461 (1999), which is incorporated by reference for all purposes as if fully set forth herein, the laser cutting efficiency of a radially polarized beam is 1.5 to 2 times larger than for plane P-polarized and circularly polarized beams. According to the present invention, the radially polarized beam is produced by passing a linearly or circularly polarized coherent light beam through an appropriate polarization grating of the present invention.

While the invention has been described with respect to a limited number of embodiments, it will be appreciated that many variations, modifications and other applications of the invention may be made.

What is claimed is:

1. An optical device, for manipulating incident light of at most a certain maximum wavelength, comprising:
   (a) a substantially planar grating including a plurality of electrically conducting stripes and having a space-variant, continuous grating vector, at least a portion of said grating having a local period less than the maximum wavelength of the incident light;
   wherein said grating vector is periodic.
2. The device of claim 1, wherein a magnitude of said grating vector varies laterally and continuously.
3. The device of claim 1, wherein a direction of said grating vector varies laterally and continuously.
4. The device of claim 1, wherein said grating is translationally periodic.
5. The device of claim 1, wherein said grating is rotationally periodic.
6. The device of claim 1, wherein said stripes include a metal.
7. The device of claim 1, further comprising:
   (b) a substrate supporting said stripes.
8. The device of claim 7 wherein said substrate includes a material selected from the group consisting of gallium arsenide, zinc selenide, quartz and silica glass.
9. A particle accelerator, comprising:
   (a) a source of light;
   (b) a first optical mechanism for forming said light into an annular beam;
   (c) the device of claim 1, for imposing radial polarization on said annular beam;
   (d) a second optical mechanism for focusing said radially polarized annular beam onto a focal region; and
   (e) a particle source for directing a beam of the particles longitudinally through said focal region.
10. A method of cutting a workpiece, comprising the steps of:
    (a) providing a beam of light;
    (b) imposing radial polarization on said beam of light, using an optical device, for manipulating incident light of at most a certain maximum wavelength, that includes a substantially planar grating, said grating including a plurality of electrically conducting stripes and having a space-variant, continuous grating vector, at least a portion of said grating having a local period less than said maximum wavelength of said incident light; and
    (c) directing said radially polarized beam at the workpiece to cut the workpiece.
11. An apparatus for measuring a polarization state of light, comprising:
    (a) the device of claim 1; and
    (b) a mechanism for measuring a lateral variation of an intensity of the light after the light has been manipulated by the device of claim 1.
12. A method of imposing a desired laterally varying modulation on an intensity of laterally uniform, polarized light of at most a certain maximum wavelength, comprising the steps of:
    (a) selecting a laterally varying direction $\beta$, relative to a reference direction, that defines the modulation;
    (b) solving an equation $$\nabla \times \vec{K}(K_0, \beta) = 0$$

for a grating vector $\vec{K}$ that is defined by a wavenumber $K_0$ and by said direction $\beta$, $\vec{K}$ being such that at least a portion of a grating fabricated in accordance with $\vec{K}$ has a local period less than the maximum wavelength of the light;
    (c) fabricating said grating in accordance with said grating vector $\vec{K}$; and
    (d) directing the light at said grating.
13. The method of claim 12, wherein said fabricating is effected by forming said grating as electrically conducting stripes on a substrate.
14. The method of claim 13, wherein said substrate includes a material selected from the group consisting of gallium arsenide, zinc selenide, quartz and silica glass.

15. A method of imposing a polarization state having a predetermined, laterally varying azimuthal angle ψ on light of at most a certain maximum wavelength, comprising the steps of:

(a) selecting a grating vector $\vec{K}$ that is defined by a wavenumber $K_0$ and by a direction β relative to a reference direction, and that defines ψ via an equation β=ψ−Δψ($K_0$), solving an equation $$\nabla \times \vec{K}(K_0,\beta)=0$$

$\vec{K}$ being such that at least a portion of a grating fabricated in accordance with $\vec{K}$ has a local period less than the maximum wavelength of the light;

(b) fabricating said grating in accordance with $\vec{K}$; and
(c) directing the light at said grating.

16. The method of claim 15, wherein said reference direction is an x-direction of a Cartesian (x,y) coordinate system, so that $K_0$ and β satisfy:

$$\frac{\partial K_0}{\partial y}\cos(\beta) - K_0 \sin(\beta)\left[\frac{\partial \psi}{\partial y} - \frac{\partial \Delta \psi}{\partial K_0}\frac{\partial K_0}{\partial y}\right] = \frac{\partial K_0}{\partial x}\sin(\beta) + K_0 \cos(\beta)\left[\frac{\partial \psi}{\partial x} - \frac{\partial \Delta \psi}{\partial K_0}\frac{\partial K_0}{\partial x}\right].$$

17. The method of claim 15, wherein said reference direction is a radial direction of a polar (r,θ) coordinate system.

18. The method of claim 15, wherein said fabricating is effected by forming said grating as electrically conducting stripes on a substrate.

19. The method of claim 18, wherein said substrate includes a material selected from the group consisting of gallium arsenide, zinc selenide, quartz and silica glass.

20. An optical device, for transforming an incident beam of light into a transformed beam of light, comprising:

(a) a substantially planar grating including a plurality of metal stripes and having a space-variant continuous grating vector, such that the transformed beam is substantially free of propagating orders higher than zero order;

wherein said grating vector is periodic.

21. The device of claim 20, wherein a magnitude of said grating vector varies laterally and continuously.

22. The device of claim 20, wherein a direction of said grating vector varies laterally and continuously.

23. The device of claim 20, wherein said stripes include a metal.

24. The device of claim 20, further comprising:

(b) a substrate supporting said stripes.

25. A particle accelerator, comprising:

(a) a source of light;
(b) a first optical mechanism for forming said light into an annular beam;
(c) the device of claim 20, for imposing radial polarization on said annular beam;
(d) a second optical mechanism for focusing said radially polarized annular beam onto a focal region; and
(e) a particle source for directing a beam of the particles longitudinally through said focal region.

26. An apparatus for measuring a polarization state of light, comprising:

(a) the device of claim 20; and
(b) a mechanism for measuring a lateral variation of an intensity of the light after the light has been manipulated by the device of claim 1.

27. A method of cutting a workpiece, comprising the steps of:

(a) providing a beam of light;
(b) imposing radial polarization on said beam of light, using an optical device, for transforming an incident beam of light into a transformed beam of light, that includes a substantially planar grating, said grating including a plurality of metal stripes and having a space-varying continuous grating vector, such that the transformed beam is substantially free of propagating orders higher than zero order; and
(c) directing said radially polarized beam at the workpiece to cut the workpiece.

28. A method of transforming an incident beam of laterally uniform, polarized light into a transformed beam having a desired laterally varying modulated intensity, comprising the steps of:

(a) selecting a laterally varying direction β, relative to a reference direction, that defines the modulation;
(b) solving an equation $$\nabla \times \vec{K}(K_0,\beta)=0$$

for a grating vector $\vec{K}$ that is defined by a wavenumber $K_0$ and by said direction β, $\vec{K}$ being such that the transformed beam is substantially free of propagating orders higher than zero order;

(c) fabricating said a grating in accordance with said grating vector $\vec{K}$; and
(d) directing the incident beam at said grating.

29. A method of transforming an incident light beam into a transformed beam upon which is imposed a polarization state having a predetermined, laterally varying azimuthal angle ψ, comprising the steps of:

(a) selecting a grating vector $\vec{K}$ that is defined by a wavenumber $K_0$ and by a direction β relative to a reference direction, and that defines ψ via an equation β=ψ−Δψ($K_0$), solving an equation $$\nabla \times \vec{K}(K_0,\beta)=0$$

$\vec{K}$ being such that the transformed beam is substantially free of propagating orders higher than zero order;

(b) fabricating a grating in accordance with $\vec{K}$; and
(c) directing the incident beam at said grating.

30. An optical device, for manipulating incident light of at most a certain maximum wavelength, comprising:

(a) a substantially planar grating including a plurality of electrically conducting stripes and having a space-variant, continuous grating vector, at least a portion of said grating having a local period less than the maximum wavelength of the incident light;

wherein said grating is operative to pass laterally uniform, polarized incident light with a predetermined, laterally varying transmissivity.

31. The device of claim 30, wherein said transmissivity varies periodically in one lateral dimension.

32. An optical device, for manipulating incident light of at most a certain maximum wavelength, comprising:

(a) a substantially planar grating including a plurality of electrically conducting stripes and having a space-variant, continuous grating vector, at least a portion of said grating having a local period less than the maximum wavelength of the incident light;

wherein said grating is operative to reflect laterally uniform, polarized incident light with a predetermined, laterally varying reflectivity.

33. The device of claim 32, wherein said reflectivity varies periodically in one lateral dimension.

34. An optical device, for manipulating incident light of at most a certain maximum wavelength, comprising:

(a) a substantially planar grating including a plurality of electrically conducting stripes and having a space-variant, continuous grating vector, at least a portion of said grating having a local period less than the maximum wavelength of the incident light;

wherein said grating is operative to transform light incident thereon into a transmitted beam having a predetermined, laterally varying polarization state.

35. The device of claim 34, wherein said transmitted beam has an azimuthal angle that varies linearly in one lateral dimension.

36. The device of claim 34, wherein said transmitted beam is radially polarized.

37. The device of claim 36, wherein said radial polarization is in-phase.

38. The device of claim 36, wherein said radial polarization is anti-phase.

39. The device of claim 34, wherein said transmitted beam is azimuthally polarized.

40. The device of claim 39, wherein said azimuthal polarization is in-phase.

41. The device of claim 39, wherein said azimuthal polarization is anti-phase.

42. An optical device, for manipulating incident light of at most a certain maximum wavelength, comprising:

(a) a substantially planar grating including a plurality of electrically conducting stripes and having a space-variant, continuous grating vector, at least a portion of said grating having a local period less than the maximum wavelength of the incident light;

wherein said grating is operative to transform light incident thereon into a reflected beam having a predetermined, laterally varying polarization state.

43. The device of claim 42, wherein said reflected beam has an azimuthal angle that varies linearly in one lateral dimension.

44. The device of claim 42, wherein said reflected beam is radially polarized.

45. The device of claim 44, wherein said radial polarization is in-phase.

46. The device of claim 44, wherein said radial polarization is anti-phase.

47. The device of claim 42, wherein said reflected beam is azimuthally polarized.

48. The device of claim 47, wherein said azimuthal polarization is in-phase.

49. The device of claim 47, wherein said azimuthal polarization is anti-phase.

50. A method of imposing a polarization state having a predetermined, laterally varying azimuthal angle $\psi$ on light of at most a certain maximum wavelength, comprising the steps of:

(a) solving an equation $$\nabla \times \vec{K}(K_0, \beta) = 0$$

for a grating vector $\vec{K}$ that is defined by a wavenumber $K_0$ and by a direction $\beta$ relative to an x-direction of a Cartesian (x,y) coordinate system, so that $K_0$ and $\beta$ satisfy:

$$\frac{\partial K_0}{\partial y}\cos(\beta) - K_0 \sin(\beta)\left[\frac{\partial \psi}{\partial y} - \frac{\partial \Delta\psi}{\partial K_0}\frac{\partial K_0}{\partial y}\right] = \frac{\partial K_0}{\partial x}\sin(\beta) + K_0 \cos(\beta)\left[\frac{\partial \psi}{\partial x} - \frac{\partial \Delta\psi}{\partial K_0}\frac{\partial K_0}{\partial x}\right]$$

$\beta$ being related to $\psi$ by $\beta = \psi - \Delta\psi(K_0)$, $\vec{K}$ being such that at least a portion of a grating fabricated in accordance with $\vec{K}$ has a local period less than the maximum wavelength of the light;

(b) fabricating said grating in accordance with $\vec{K}$; and (c) directing the light at said grating.

51. An optical device, for transforming an incident beam of light into a transformed beam of light, comprising:

(a) a substantially planar grating including a plurality of metal stripes and having a space-variant continuous grating vector, such that the transformed beam is substantially free of propagating orders higher than zero order;

wherein the transformed beam is a transmitted beam, and wherein said grating is operative to pass laterally uniform, polarized incident light with a predetermined, laterally varying transmissivity.

52. An optical device, for transforming an incident beam of light into a transformed beam of light, comprising:

(a) a substantially planar grating including a plurality of metal stripes and having a space-variant continuous grating vector, such that the transformed beam is substantially free of propagating orders higher than zero order;

wherein the transformed beam is a reflected beam, and wherein said grating is operative to reflect laterally uniform, polarized incident light with a predetermined, laterally varying reflectivity.

53. An optical device, for transforming an incident beam of light into a transformed beam of light, comprising:

(a) a substantially planar grating including a plurality of metal stripes and having a space-variant continuous grating vector, such that the transformed beam is substantially free of propagating orders higher than zero order;

wherein the transformed beam is a transmitted beam having a predetermined, laterally varying polarization state.

54. An optical device, for transforming an incident beam of light into a transformed beam of light, comprising:
  (a) a substantially planar grating including a plurality of metal stripes and having a space-variant continuous grating vector, such that the transformed beam is substantially free of propagating orders higher than zero order;
wherein the transformed beam is a reflected beam having a predetermined, laterally varying polarization state.

55. A method of transforming an incident light beam into a transformed beam upon which is imposed a polarization state having a predetermined, laterally varying azimuthal angle $\psi$, comprising the steps of:
  (a) solving an equation $$\nabla \times \vec{K}(K_0, \beta) = 0$$

for a grating vector $\vec{K}$ that is defined by a wavenumber $K_0$ and by a direction $\beta$ relative to an x-direction of a Cartesian (x,y) coordinate system, so that $K_0$ and $\beta$ satisfy:

$$\frac{\partial K_0}{\partial y} \cos(\beta) - K_0 \sin(\beta) \left[ \frac{\partial \psi}{\partial y} - \frac{\partial \Delta \psi}{\partial K_0} \frac{\partial K_0}{\partial y} \right] =$$

$$\frac{\partial K_0}{\partial x} \sin(\beta) + K_0 \cos(\beta) \left[ \frac{\partial \psi}{\partial x} - \frac{\partial \Delta \psi}{\partial K_0} \frac{\partial K_0}{\partial x} \right]$$

$\beta$ being related to $\psi$ by $\beta = \psi - \Delta \psi(K_0)$, $\vec{K}$ being such that the transformed beam is substantially free of propagating orders higher than zero order;
  (b) fabricating a grating in accordance with $\vec{K}$; and
  (c) directing the incident beam at said grating.

* * * * *